US008480476B2

(12) United States Patent
Fujimori et al.

(10) Patent No.: US 8,480,476 B2
(45) Date of Patent: Jul. 9, 2013

(54) GAMING MACHINE CAPABLE OF RUNNING COMMON GAME, AND COMMUNICATION CONTROL METHOD THEREOF

(75) Inventors: Kenichi Fujimori, Tokyo (JP); Yuji Miyagawa, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 412 days.

(21) Appl. No.: 12/791,246

(22) Filed: Jun. 1, 2010

(65) Prior Publication Data

US 2010/0304840 A1 Dec. 2, 2010

(30) Foreign Application Priority Data

Jun. 1, 2009 (JP) ................................ 2009-132467

(51) Int. Cl.
*G06F 17/00* (2006.01)

(52) U.S. Cl.
USPC ............................................ 463/20; 463/16

(58) Field of Classification Search
USPC ................................................ 463/16-20
See application file for complete search history.

(56) References Cited

U.S. PATENT DOCUMENTS

| | | | | |
|---|---|---|---|---|
| 4,283,709 | A | 8/1981 | Lucero et al. | |
| 5,820,459 | A | 10/1998 | Acres et al. | |
| 6,003,013 | A | 12/1999 | Boushy et al. | |
| 6,142,872 | A | 11/2000 | Walker et al. | |
| 6,361,441 | B1 | 3/2002 | Walker et al. | |
| 6,733,390 | B2 | 5/2004 | Walker et al. | |
| 2002/0042296 | A1 | 4/2002 | Walker et al. | |
| 2009/0005177 | A1 | 1/2009 | Kishi et al. | |
| 2009/0275410 | A1 * | 11/2009 | Kisenwether et al. | 463/42 |
| 2010/0137052 | A1 * | 6/2010 | Bennett | 463/16 |
| 2010/0203955 | A1 * | 8/2010 | Sylla | 463/25 |
| 2010/0317424 | A1 * | 12/2010 | Hornik et al. | 463/20 |

* cited by examiner

*Primary Examiner* — Michael Cuff
(74) *Attorney, Agent, or Firm* — Edwards Wildman Palmer LLP

(57) ABSTRACT

A slot machine 10 transmits a game information requesting command when being booted. An external controller 200, when receiving the game information requesting command, transmits common game information stored in a RAM 243, which information for use in running a common game, to the slot machine 10. The slot machine 10 runs the common game based on the common game information received from the external controller 200.

7 Claims, 31 Drawing Sheets

FIG. 10

INDIVIDUAL GAME SYMBOL COLUMNS

| CODE NO. | FIRST VIDEO REEL | SECOND VIDEO REEL | THIRD VIDEO REEL | FOURTH VIDEO REEL | FIFTH VIDEO REEL |
|---|---|---|---|---|---|
| | SYMBOL | SYMBOL | SYMBOL | SYMBOL | SYMBOL |
| 00 | ORANGE | CHERRY | ORANGE | STRAWBERRY | BLUE7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE7 |
| 06 | ORANGE | PLUM | ORANGE | APPLE | ORANGE |
| 07 | PLUM | CHERRY | PLUM | BLUE7 | APPLE |
| 08 | BLUE7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE7 | STRAWBERRY | CHERRY | ORANGE |
| 14 | BLUE7 | BELL | BLUE7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE7 | BELL | ORANGE | CHERRY | PLUM |
| 21 | CHERRY | APPLE | PLUM | PLUM | STRAWBERRY |

FIG. 11

INDIVIDUAL GAME SYMBOL COMBINATION TABLE

| SYMBOL COMBINATION | | | | | PAYOUT NUMBER | WINNING COMBINATION |
|---|---|---|---|---|---|---|
| FIRST VIDEO REEL | SECOND VIDEO REEL | THIRD VIDEO REEL | FOURTH VIDEO REEL | FIFTH VIDEO REEL | | |
| APPLE | APPLE | APPLE | APPLE | APPLE | BONUS GAME※ | BONUS GAME TRIGGER |
| BLUE7 | BLUE7 | BLUE7 | BLUE7 | BLUE7 | 10 | BLUE |
| BELL | BELL | BELL | BELL | BELL | 8 | BELL |
| CHERRY | CHERRY | CHERRY | CHERRY | CHERRY | 5 | CHERRY3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE3 |
| CHERRY | CHERRY | CHERRY | (ANY) | (ANY) | 2 | CHERRY2 |
| ORANGE | ORANGE | ORANGE | (ANY) | (ANY) | 2 | ORANGE2 |
| CHERRY | (ANY) | (ANY) | (ANY) | (ANY) | 1 | CHERRY1 |
| ORANGE | (ANY) | (ANY) | (ANY) | (ANY) | 1 | ORANGE1 |

※FREE GAME IS PERFORMED A RANDOMLY-DETERMINED NUMBER OF TIMES

FIG. 13

COMMON GAME SYMBOL COLUMN

| | FIRST VIDEO REEL | SECOND VIDEO REEL | THIRD VIDEO REEL | FOURTH VIDEO REEL | FIFTH VIDEO REEL |
|---|---|---|---|---|---|
| CODE NO. | SYMBOL | SYMBOL | SYMBOL | SYMBOL | SYMBOL |
| 00 | ANGELFISH | TUNA | TUNA | COELACANTH | CLOWNFISH |
| 01 | CLOWNFISH | COELACANTH | TUNA | ANGELFISH | TUNA |
| 02 | ANGELFISH | TUNA | ANGELFISH | CLOWNFISH | ANGELFISH |
| 03 | CLOWNFISH | COELACANTH | TUNA | TUNA | COELACANTH |
| 04 | ANGELFISH | TUNA | ANGELFISH | COELACANTH | CLOWNFISH |
| 05 | CLOWNFISH | ANGELFISH | CLOWNFISH | CLOWNFISH | 7 |
| 06 | ANGELFISH | CLOWNFISH | ANGELFISH | TUNA | ANGELFISH |
| 07 | CLOWNFISH | TUNA | CLOWNFISH | 7 | TUNA |
| 08 | 7 | COELACANTH | ANGELFISH | CLOWNFISH | CLOWNFISH |
| 09 | TUNA | TUNA | CLOWNFISH | ANGELFISH | COELACANTH |
| 10 | ANGELFISH | COELACANTH | ANGELFISH | COELACANTH | TUNA |
| 11 | COELACANTH | ANGELFISH | CLOWNFISH | ANGELFISH | CLOWNFISH |
| 12 | ANGELFISH | CLOWNFISH | COELACANTH | CLOWNFISH | COELACANTH |
| 13 | TUNA | 7 | ANGELFISH | TUNA | ANGELFISH |
| 14 | 7 | COELACANTH | 7 | TUNA | TUNA |
| 15 | ANGELFISH | TUNA | COELACANTH | ANGELFISH | COELACANTH |
| 16 | TUNA | COELACANTH | TUNA | TUNA | TUNA |
| 17 | CLOWNFISH | COELACANTH | CLOWNFISH | COELACANTH | ANGELFISH |
| 18 | ANGELFISH | CLOWNFISH | ANGELFISH | CLOWNFISH | COELACANTH |
| 19 | CLOWNFISH | TUNA | CLOWNFISH | ANGELFISH | ANGELFISH |
| 20 | 7 | COELACANTH | ANGELFISH | TUNA | TUNA |
| 21 | TUNA | TUNA | CLOWNFISH | CLOWNFISH | CLOWNFISH |

FIG. 14

COMMON GAME SYMBOL
COMBINATION TABLE

| WINNING COMBINATION | PAYOUT NUMBER | NUMBER OF LEDS TO BE LIGHTED |
|---|---|---|
| CLOWNFISH | 4 | 2 |
| COELACANTH | 8 | 4 |
| ANGELFISH | 12 | 6 |
| TUNA | 16 | 8 |
| 7 | 20 | 10 |

※THREE OR MORE SYMBOLS OF THE SAME KIND ON WINNING LINE LEADS TO WINNING

GAMING MACHINE CAPABLE OF RUNNING COMMON GAME, AND COMMUNICATION CONTROL METHOD THEREOF

CROSS REFERENCE TO RELATED APPLICATION

The present application claims priority from Japanese application No. 2009-132467, which was filed on Jun. 1, 2009, the entire disclosure of which is herein incorporated by reference.

BACKGROUND OF THE INVENTION

1. Field of the Invention

The present invention relates to a gaming machine capable of running a common game, and a communication control method therefor.

2. Description of Related Art

There has been known a gaming machine including a plurality of gaming terminals, a terminal controller provided to each gaming terminal and causes the gaming terminal to run a game, a collective control device connected to and in communication with the gaming terminals, and a center controller provided in the collective control device. Such a gaming machine is disclosed, for example, in the specifications of U.S. Pat. No. 5,820,459, U.S. Pat. No. 4,283,709, U.S. Pat. No. 6,003,013, U.S. patent publication No. 2002/0042296, U.S. Pat. No. 6,733,390, U.S. Pat. No. 6,142,872, and U.S. Pat. No. 6,361,441. Each terminal controller independently runs an individual game in the associated gaming terminal, and awards a payout based on the running of the individual game. The center controller determines whether to start a common game commonly run in the plurality of gaming terminals, based on the status of the individual game running in the gaming terminal. Further, the center controller determines the game result of the common game, based on the status of the common game running in the gaming terminal. For example, this common game is a game in which a plurality of players compete against one another to win various types of jackpot such as a progressive jackpot and a mystery jackpot, through a plurality of gaming terminals.

Further, as is disclosed in the specification of U.S. patent publication No. 2009/0005177, a game program (individual game program) used at the time of running the individual game is stored in a storage medium such as CF (CompactFlash®), which is attached to each of the gaming terminals.

The individual game program is loaded from the storage medium to the gaming terminal, and the individual game is run in the gaming terminal, based on the individual game program.

Similarly, a game program (common game program) used at the time of running a common game is also stored in the storage medium such as CF attached to each of the gaming terminals. When the common game program is loaded from the storage medium into the gaming terminal and when the center controller determined to start the common game, the common game is run in each of the gaming terminals, based on the common game program.

However, a game provider (casino owner) is required to change the common game (i.e., common game program) in a short period of time. This is because, for example, players are very much likely to get bored of the common game commonly run in the plurality of gaming terminals.

To change the common game however required exchanging of the storage medium attached to each of the gaming terminals, which is a significant amount of work for the game provider.

It is therefore an object of the present invention to provide a gaming machine which requires a less amount of work for changing a common game which is commonly run in a plurality of gaming terminals, and to provide a communication control method adopted in the gaming machine.

SUMMARY OF THE INVENTION

A gaming machine of the present invention includes:

a plurality of gaming terminals each having a terminal-side game information storage device which stores common game information used in a common game commonly run in the plurality of gaming terminals and individual game information used in an individual game individually run in each gaming terminal, an input device which allows an input from the exterior, and a terminal controller;

a collective control device connected to and in communication with the gaming terminals, which has a gaming terminal information storage device storing an accumulated value of trigger values for use in determining a starting condition of the common game in the form of total accumulated value common in the plurality of gaming terminals or in the form of individual accumulated value of each of the gaming terminals, a game information management device for managing the common game information, and a center controller, wherein the terminal controller is programmed to execute the steps of:

(a1) transmitting a game information requesting command to the collective control device, when booting the gaming terminal;

(a2) storing the common game information received from the collective control device in the terminal-side game information storage device;

(a3) running the individual game in response to an input of start operation through the input device, based on the individual game information stored in the terminal-side game information storage device;

(a4) transmitting a trigger value to the collective control device, every time the individual game is run;

(a5) running the common game in response to a common game starting command from the collective control device, based on the common game information stored in the terminal-side game information storage device; and (a6) awarding a payout of the common game, based on a game result of the common game from the collective control device, and wherein the center controller is programmed to execute the steps of:

(b1) transmitting, in response to the game information requesting command from any of the gaming terminals, the common game information managed by the game information management device to that gaming terminal;

(b2) when a trigger value is received from any of the gaming terminals, adding the trigger value to the total accumulated value or the individual accumulated value stored in the gaming terminal information storage device of the gaming terminal having transmitted the trigger value;

(b3) transmitting to the plurality of gaming terminals a common game starting command for starting the common game in each of the gaming terminals, when the total accumulated value or the individual accumulated value of any one of the gaming terminals stored in the gaming terminal information storage device reaches a predetermined threshold;

(b4) determining a game result of the common game in each gaming terminal, based on the status of the common game running; and (b5) transmitting the game results of the common game to the plurality of gaming terminals.

In the above structure, the terminal controller transmits the game information requesting command to the collective control device, when the gaming terminal is booted. The center controller transmits, to the gaming terminal, the common game information managed by the game information management device, in response to the game information requesting command from the gaming terminal. The terminal controller stores the common game information received from the collective control device, in the terminal-side game information storage device. Meanwhile, the terminal controller transmits a trigger value to the collective control device, every time the individual game is run. When the trigger value is received from any of the gaming terminals, the center controller adds the trigger value to the total accumulated value or the individual accumulated value stored in the gaming terminal information storage device of the gaming terminal having transmitted the trigger value. When the total accumulated value or the individual accumulated value of any one of the gaming terminals reaches a predetermined threshold, the center controller transmits to the plurality of gaming terminals a common game starting command for starting the common game in each gaming terminal. The terminal controller runs the common game based on the common game information stored in the terminal-side game information storage device, in response to the common game starting command from the collective control device. Thus, simply changing the common game information managed by the game information management device of the collective control device changes the common game information of all the gaming terminals connected and in communication with the collective control device. This reduces the work required for changing the common game information for use in the common game. Further, the common game information is received from the collective control device, at the time of booting the gaming terminal. The gaming terminal therefore is able to run the common game based on the common game information, immediately after the reception of the common game starting command from the collective control device.

A gaming machine of the present invention includes:

a plurality of gaming terminals each having a terminal-side game information storage device which stores common game information used in a common game commonly run in the plurality of gaming terminals and individual game information used in an individual game individually run in each gaming terminal, an input device which allows an input from the exterior, and a terminal controller;

a collective control device connected to and in communication with the gaming terminals, which has a game information management device for managing the common game information, and a center controller, wherein the terminal controller is programmed to execute the steps of:

(c1) transmitting a game information requesting command to the collective control device, when booting the gaming terminal;

(c2) storing the common game information received from the collective control device in the terminal-side game information storage device;

(c3) running the individual game in response to an input of start operation through the input device, based on the individual game information stored in the terminal-side game information storage device;

(c4) running the common game in response to a common game starting command from the collective control device, based on the common game information stored in the terminal-side game information storage device; and (c5) awarding a payout of the common game, based on a game result of the common game from the collective control device, and wherein the center controller is programmed to execute the steps of:

(d1) transmitting, in response to the game information requesting command from any of the gaming terminals, the common game information managed by the game information management device to that gaming terminal;

(d2) determining whether or not a common game starting condition is met, based on the status of the individual game running in the gaming terminal;

(d3) when the common game starting condition is met, transmitting the common game starting command to the plurality of gaming terminals;

(d4) determining a game result of the common game in each gaming terminal, based on the status of the common game running; and (d5) transmitting the game results of the common game to the plurality of gaming terminals.

In the above structure, the terminal controller transmits the game information requesting command to the collective control device, when the gaming terminal is booted. The center controller transmits, to the gaming terminal, the common game information managed by the game information management device, in response to the game information requesting command from the gaming terminal. The terminal controller stores the common game information received from the collective control device, in the terminal-side game information storage device. Further, the center controller determines whether or not the common game starting condition is met, based on the status of the individual game running in the gaming terminal. When the common game starting condition is met, the center controller transmits the common game starting command to the plurality of gaming terminals. The terminal controller runs the common game based on the common game information stored in the terminal-side game information storage device, in response to the common game starting command from the collective control device. Thus, simply changing the common game information managed by the game information management device of the collective control device changes the common game information of all the gaming terminals connected and in communication with the collective control device. This reduces the work required for changing the common game information for use in the common game. Further, the common game information is received from the collective control device, at the time of booting the gaming terminal. The gaming terminal therefore is able to run the common game based on the common game information, immediately after the reception of the common game starting command from the collective control device.

A gaming machine of the present invention includes:

a plurality of gaming terminals each having a terminal-side game information storage device which stores common game information used in a common game commonly run in the plurality of gaming terminals, identification information corresponding to the common game information, and individual game information used in an individual game individually run in each gaming terminal, an input device which allows an input from the exterior, and a terminal controller;

a collective control device connected to and in communication with the gaming terminals, which has a game information management device for managing the common game information and the identification information, and a center controller, wherein the terminal controller is programmed to execute the steps of:

(e1) transmitting to the collective control device a game information requesting command including the identification information stored in the terminal-side game information storage device, when booting the gaming terminal;

(e2) when the common game information and the identification information are received from the collective control device, storing the common game information and the identification information received in the terminal-side game information storage device;

(e3) running the individual game in response to an input of start operation through the input device, based on the individual game information stored in the terminal-side game information storage device;

(e4) running the common game in response to a common game starting command from the collective control device, based on the common game information stored in the terminal-side game information storage device; and (e5) awarding a payout of the common game, based on the game result of the common game from the collective control device, and wherein the center controller is programmed to execute the steps of:

(f1) receiving the game information requesting command from the gaming terminal, and determining whether the identification information contained in the game information requesting command and the identification information managed by the game information management device match with each other;

(f2) only when it is determined that the pieces of identification information do not match with each other in (f1), transmitting the common game information and the identification information corresponding to the common game information, the common game information and the identification information being managed by the game information management device, to the gaming terminal having transmitted the game information requesting command;

(f3) determining whether or not a common game starting condition is met, based on the status of the individual game running in the gaming terminal;

(f4) when the common game starting condition is met, transmitting the common game starting command to the plurality of gaming terminals;

(f5) determining the game result of the common game based on the state of the common game running in the gaming terminal;

(f6) transmitting the game results of the common game to the plurality of gaming terminals.

In the above structure, the terminal controller transmits to the collective control device the game information requesting command containing the identification information stored in the terminal-side game information storage device, when the gaming terminal is booted. The center controller determines whether the identification information contained in the game information requesting command from the gaming terminal matches with the identification information managed by the game information management device. Only if the two pieces of identification information do not match with each other, the center controller transmits the common game information and the identification information managed by the game information management device to the gaming terminal. The terminal controller stores the common game information received from the collective control device, in the terminal-side game information storage device. Further, the center controller determines whether or not the common game starting condition is met, based on the status of the individual game running in the gaming terminal. When the common game starting condition is met, the center controller transmits the common game starting command to the plurality of gaming terminals. The terminal controller runs the common game based on the common game information stored in the terminal-side game information storage device, in response to the common game starting command from the collective control device. Thus, simply changing the common game information managed by the game information management device of the collective control device changes the common game information of all the gaming terminals connected and in communication with the collective control device. This reduces the work required for changing the common game information for use in the common game. Further, the collective control device transmits the common game information to the gaming terminal, only when the common game information stored in the terminal-side game information storage device of the gaming terminal and the common game information managed by the game information management device of the collective control device do not match with each other. This reduces the work for changing the common game information. Further, the common game information is received from the collective control device, at the time of booting the gaming terminal. The gaming terminal therefore is able to run the common game based on the common game information, immediately after the reception of the common game starting command from the collective control device.

A communication control method of the present invention is for use in a gaming machine including: a plurality of gaming terminals each having a terminal-side game information storage device which stores common game information used in a common game commonly run in the plurality of gaming terminals and individual game information used in an individual game individually run in each gaming terminal, and an input device which allows an input from the exterior; a collective control device connected to and in communication with the gaming terminals, which has a gaming terminal information storage device storing an accumulated value of trigger values for use in determining a starting condition of the common game in the form of total accumulated value common in the plurality of gaming terminals or in the form of individual accumulated value of each of the gaming terminals, and a game information management device for managing the common game information, wherein the gaming terminal is programmed to execute the steps of:

transmitting a game information requesting command to the collective control device, when booting the gaming terminal;

storing the common game information received from the collective control device in the terminal-side game information storage device;

running the individual game in response to an input of start operation through the input device, based on the individual game information stored in the terminal-side game information storage device;

transmitting a trigger value to the collective control device, every time the individual game is run;

running the common game in response to a common game starting command from the collective control device, based on the common game information stored in the terminal-side game information storage device; and awarding a payout of the common game, based on the game result of the common game from the collective control device, and wherein the collective control device is programmed to perform the steps of:

transmitting, in response to the game information requesting command from any of the gaming terminals, the common game information managed by the game information management device to that gaming terminal;

when a trigger value is received from any of the gaming terminals, adding the trigger value to the total accumulated value or the individual accumulated value stored in the gaming terminal information storage device of the gaming terminal having transmitted the trigger value;

transmitting to the plurality of gaming terminals a common game starting command for starting the common game in each of the gaming terminals, when the total accumulated value or the individual accumulated value of any one of the gaming terminals stored in the gaming terminal information storage device reaches a predetermined threshold;

determining a game result of the common game in each gaming terminal, based on the status of the common game running; and transmitting the game results of the common game to the plurality of gaming terminals.

In the above structure, the gaming terminal transmits the game information requesting command to the collective control device, when the gaming terminal is booted. The collective control device transmits, to the gaming terminal, the common game information managed by the game information management device, in response to the game information requesting command from the gaming terminal. The gaming terminal stores the common game information received from the collective control device, in the terminal-side game information storage device. Meanwhile, the terminal controller transmits a trigger value to the collective control device, every time the individual game is run. When the trigger value is received from any of the gaming terminals, the collective control device adds the trigger value to the total accumulated value or the individual accumulated value stored in the gaming terminal information storage device of the gaming terminal having transmitted the trigger value. When the total accumulated value or the individual accumulated value of any one of the gaming terminals reaches a predetermined threshold, the collective control device transmits to the plurality of gaming terminals a common game starting command for starting the common game in each gaming terminal. The gaming terminal runs the common game based on the common game information stored in the terminal-side game information storage device, in response to the common game starting command from the collective control device. Thus, simply changing the common game information managed by the game information management device of the collective control device changes the common game information of all the gaming terminals connected and in communication with the collective control device. This reduces the work required for changing the common game information for use in the common game. Further, the common game information is received from the collective control device, at the time of booting the gaming terminal. The gaming terminal therefore is able to run the common game based on the common game information, immediately after the reception of the common game starting command from the collective control device.

BRIEF DESCRIPTION OF THE DRAWINGS

FIG. 10 is an explanatory diagram showing symbol columns in an individual game.

FIG. 11 is an explanatory diagram showing a symbol combination table for the individual game.

FIG. 13 is an explanatory diagram illustrating symbol columns in the common game.

FIG. 14 is an explanatory diagram showing a symbol combination table for the common game.

DESCRIPTION OF THE PREFERRED EMBODIMENTS

Gaming Machine Overview

Figure 1:
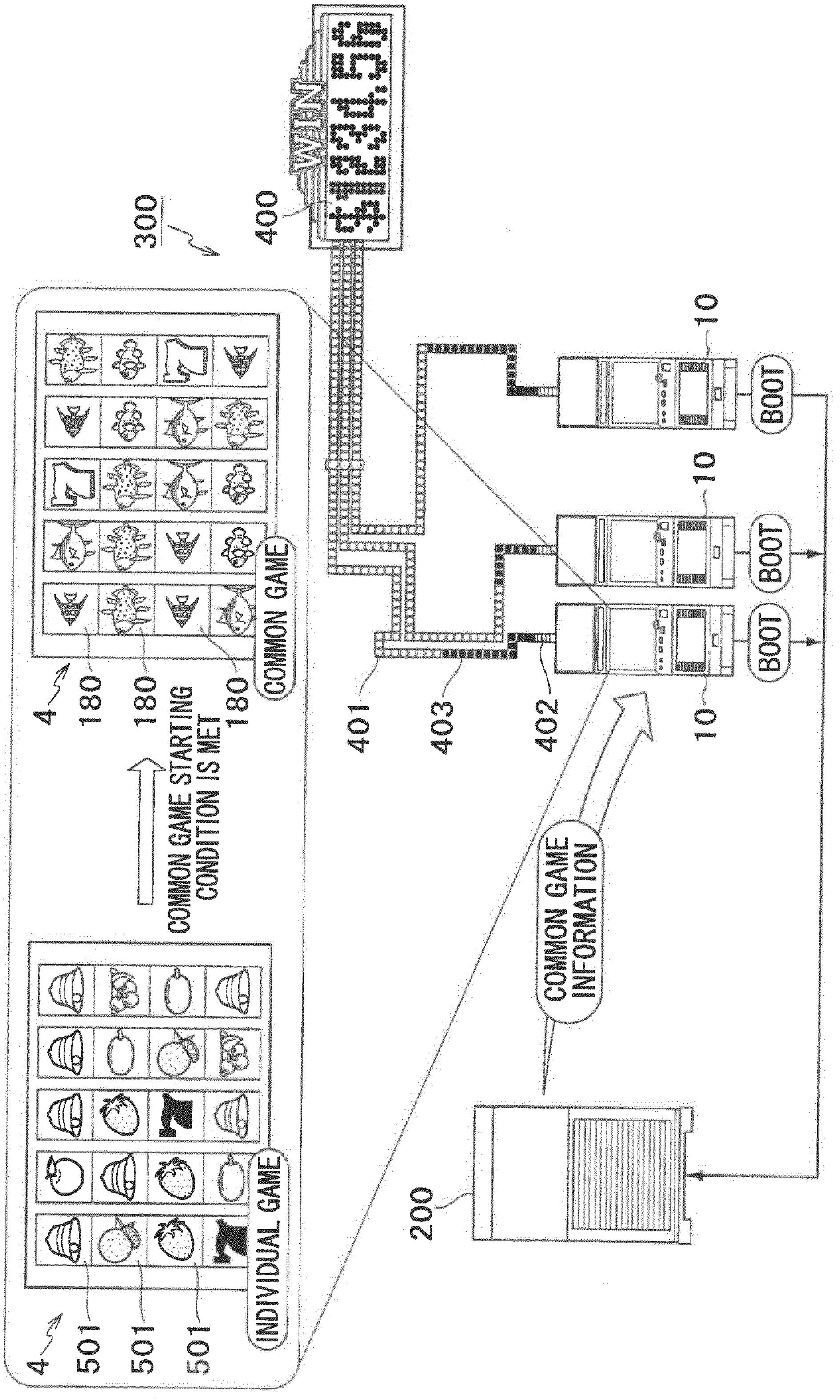
FIG. 1 is an explanatory diagram showing a gaming machine of the present invention and a communication control method of the present invention used in the gaming machine.

As shown in FIG. 1, a gaming machine 300 includes a plurality of slot machines 10 (gaming terminals) which are connected to and in communication with an external controller 200 (collective control device). When any of the slot machines 10 is booted, common game information for use in a common game commonly run in the plurality of slot machines 10 is transmitted from the external controller 200 to that slot machine 10.

Specifically, the gaming machine 300 includes: the plurality of slot machines 10 each having a terminal-side game information storage device which stores common game information used in a common game commonly run in the plurality of slot machines 10 and individual game information used in an individual game individually run in each gaming terminal, an input device which allows an input from the exterior, and a terminal controller programmed to perform the following steps (a1) to (a6); the external controller 200 connected to and in communication with the slot machines 10, which has a gaming terminal information storage device storing an accumulated value of trigger values for use in determining a starting condition of the common game in the form of total accumulated value common in the plurality of slot machines 10 or in the form of individual accumulated value of each of the slot machines 10, a game information management device for managing the common game information, and a center controller programmed to perform the following steps (b1) to (b5).

The steps step (a1) to (a6) performed by the terminal controller of each slot machine 10 is described. Step (a1) is a step for transmitting a game information requesting command to the external controller 200, when booting the slot machine 10. The "game information requesting command" is a command that requests transmission of the common game information managed in the game information management device to the slot machine 10. The "common game information" is a game program used when performing the common game in each slot machine 10.

Step (a2) is a step for storing the common game information received from the external controller 200 in the terminal-side game information storage device. Step (a3) is a step for running the individual game in response to an input of start operation through the input device, based on the individual game information stored in the terminal-side game information storage device. The "individual game information" is a game program used when the individual game is run.

Step (a4) is for transmitting a trigger value to the external controller 200, every time the individual game is run. The "trigger value" is a value for determining whether a starting condition of the common game is met. This trigger value is, for example, a game value such as an amount of bet placed in the individual game, or the number of times the individual game has been played.

Step (a5) is for running the common game in response to a common game starting command from the external controller 200, based on the common game information stored in the terminal-side game information storage device. The common game may be run in place of the individual game, or the individual game and the common game may be run in parallel.

Step (a6) is a step for awarding a payout of the common game, based on a game result of the common game from the external controller 200.

Next, the steps step (b1) to (b5) performed by the external controller 200 is described. Step (b1) is a step for transmitting, in response to the game information requesting command from any of the slot machine 10, the common game information managed by the game information management device to that slot machine 10. Step (b2) is a step for, when a trigger value is received from any of the slot machines 10, adding the trigger value to the total accumulated value or the individual accumulated value stored in the gaming terminal information storage device of the slot machine 10 having transmitted the trigger value.

The "total accumulated value" is an accumulated value of the trigger values transmitted from the plurality of slot machines 10 connected to and in communication with the external controller 200, and is stored in the gaming terminal information storage device of the external controller 200. Further, the "individual accumulated value" is an accumulated value of the trigger values for each of the slot machines 10, and is stored in the gaming terminal information storage device of the external controller 200, in association with each of the slot machines 10. In other words, the number of individual accumulated values is the same as the number of slot machines 10 connected to and in communication with the external controller 200.

Step (b3) is a step for transmitting to the plurality of slot machines 10 a common game starting command for starting the common game in each of the slot machines 10, when the total accumulated value stored in the gaming terminal information storage device or the individual accumulated value of any one of the slot machines 10 reaches a predetermined threshold. Step (b4) is a step for determining a game result of the common game in each slot machine 10, based on the status of the common game running. Step (b5) is a step for transmitting the game results of the common game to the plurality of slot machines 10.

Each of the "slot machines 10" is a type of gaming terminal in the gaming machine 300. Note that the present embodiment is described using slot machines 10 as an example of gaming terminals; however, the present invention is not limited to this: The present invention may adopt a model which has a terminal controller capable of independently running an individual game.

The "individual game" in the present invention is a game run in the slot machine 10, based on the individual game information. The individual game is a slot game where a plurality of symbols 501 are rearranged. Note that the individual game is not limited to slot game: The base game may be any type as long as it is independently runnable in gaming terminals such as slot machines 10. Further, in the present embodiment, there are two types of individual games: the base game and the bonus game. However, the base game is not limited to these two types.

Rearrangement of the symbols 501 in the slot game is performed at a symbol display region 4. The slot game includes: running of a base game in which symbols 501 are rearranged in the symbol display region 4 on the premise that a game value is bet and a base payout is awarded according to the symbols 501 rearranged; and running of a bonus game with a higher payout ratio than the base game, in which symbols 501 are rearranged when the symbols 501 rearranged in the base game 501 meet a predetermined condition, and awards a bonus payout according to the symbols 501 rearranged.

The "game value" is a coin, bill, or electrically valuable information corresponding to these. Note that the game value in the present invention is not particularly limited. Examples of the game value include game media such as medals, tokens, cyber money, tickets, and the like. A ticket is not particularly limited, and a later-mentioned ticket with a barcode may be adopted for example.

The "bonus game "has a same meaning as a" feature game". In the present embodiment, the bonus game is a game in which a free game is repeated. However, the bonus game is not particularly limited and may be any type of game, provided that the bonus game is more advantageous than the base game for a player. Another bonus game may be adopted in combination, provided that a player is given a more advantageous playing conditions than the base game. For example, the bonus game may be a game that provides a player with a chance of winning more game values than the base game or a game that provides a player with a higher chance of winning game values than the base game. Alternatively, the bonus game may be a game that consumes fewer amounts of game values than the base game. In the bonus game, these games may be provided alone or in combination.

The "free game" is a game runnable with a bet of fewer game values than the base game. Note that "bet of fewer game values" encompasses a bet of zero game value. The "free game" therefore may be a game runnable without a bet of game value, which awards an amount of game value based on symbols 501 rearranged. In other words, the "free game" may be a game which is started without the premise that a game value is consumed. To the contrary, the "base game" is a game runnable on condition that a game value is bet, which awards an amount of game value based on symbols 501 rearranged. In other words, the "base game" is a game which starts on the premise that a game value is consumed.

The expression "rearrange" means dismissing an arrangement of symbols 501, and once again arranging symbols 501. The expression "arrangement" means a state of symbols 501, which can be visibly confirmed by a player.

The "common game" is a game commonly run in the plurality of slot machines 10. This common game is run in each slot machine 10, in response to a common game starting command from the external controller 200, based on the common game information stored in the terminal-side game information storage unit 654. The external controller 200 determines the game result of the common game based on the status of the common game running in the slot machines 10, and transmits game result information indicative of the game result to the slot machines 10. The slot machine 10 is awards a payout of the common game, according to the game result information from the external controller 200.

Specifically, the common game of the present embodiment is as follows. First, in each of the slot machines 10, the a plurality of symbols 180 for the common game are rearranged in the symbol display region 4. If the plurality of symbols 180 rearranged forms a winning combination of the common game, the states of light emitting portions 403 of a path 401 associated with the slot machine 10 having achieved the winning combination are serially changed, starting from a position 402 to a common game payout display unit 400. When the states of the light emitting portions 403 are changed all the way to the common game payout display unit 400, the slot machine associated with the path 401 awards a payout of the common game. This is the overview of the common game related to the present embodiment. The common game of the present invention is not limited to the one described above, and may be any given game such as craps game or the like, provided that the common game is commonly run in the plurality of slot machines 10.

(Functional Block of Gaming Machine 300: Slot Machine)

Figure 2:
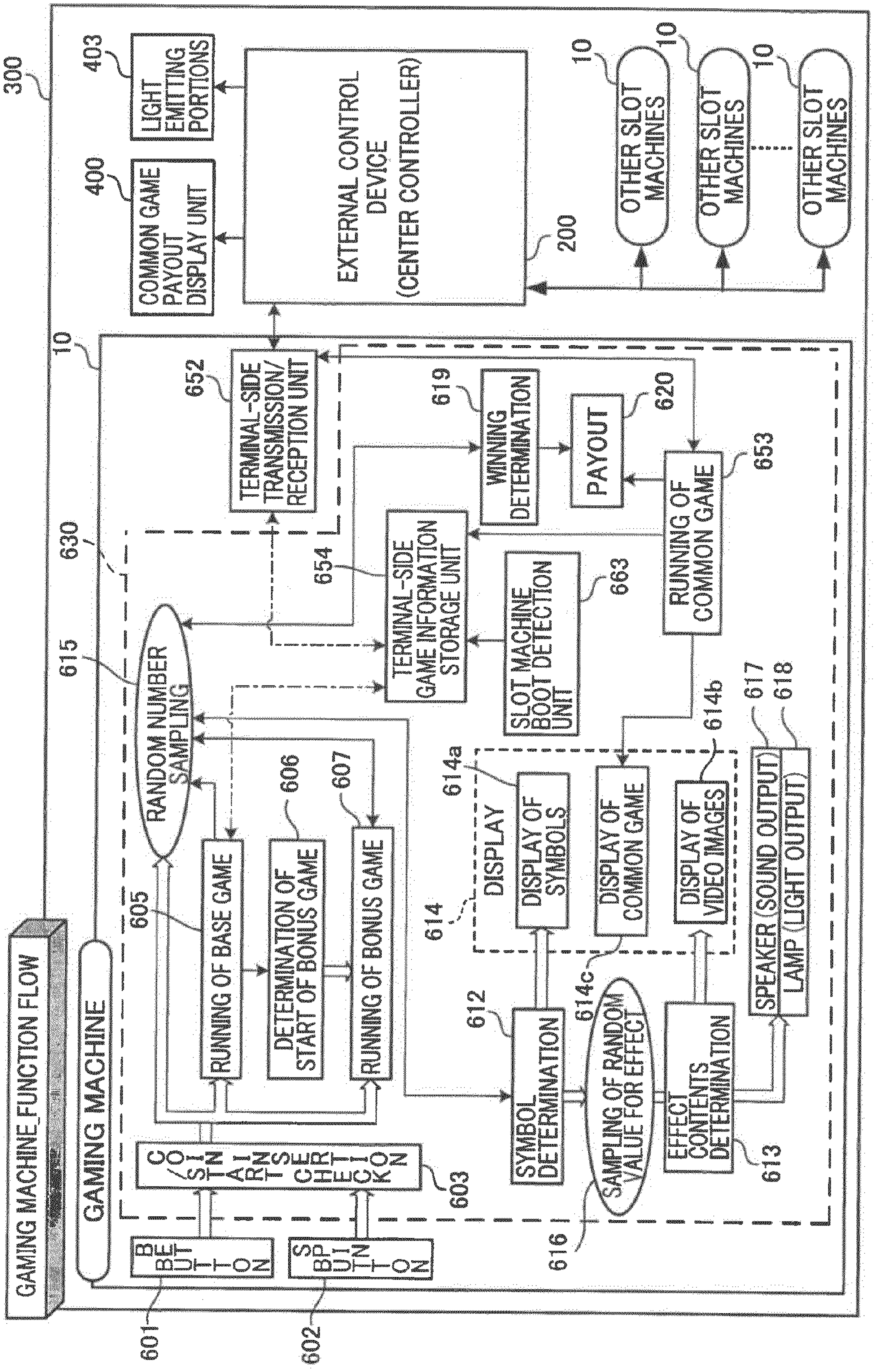
FIG. 2 is a block view of a slot machine in the gaming machine.
Figure 3:
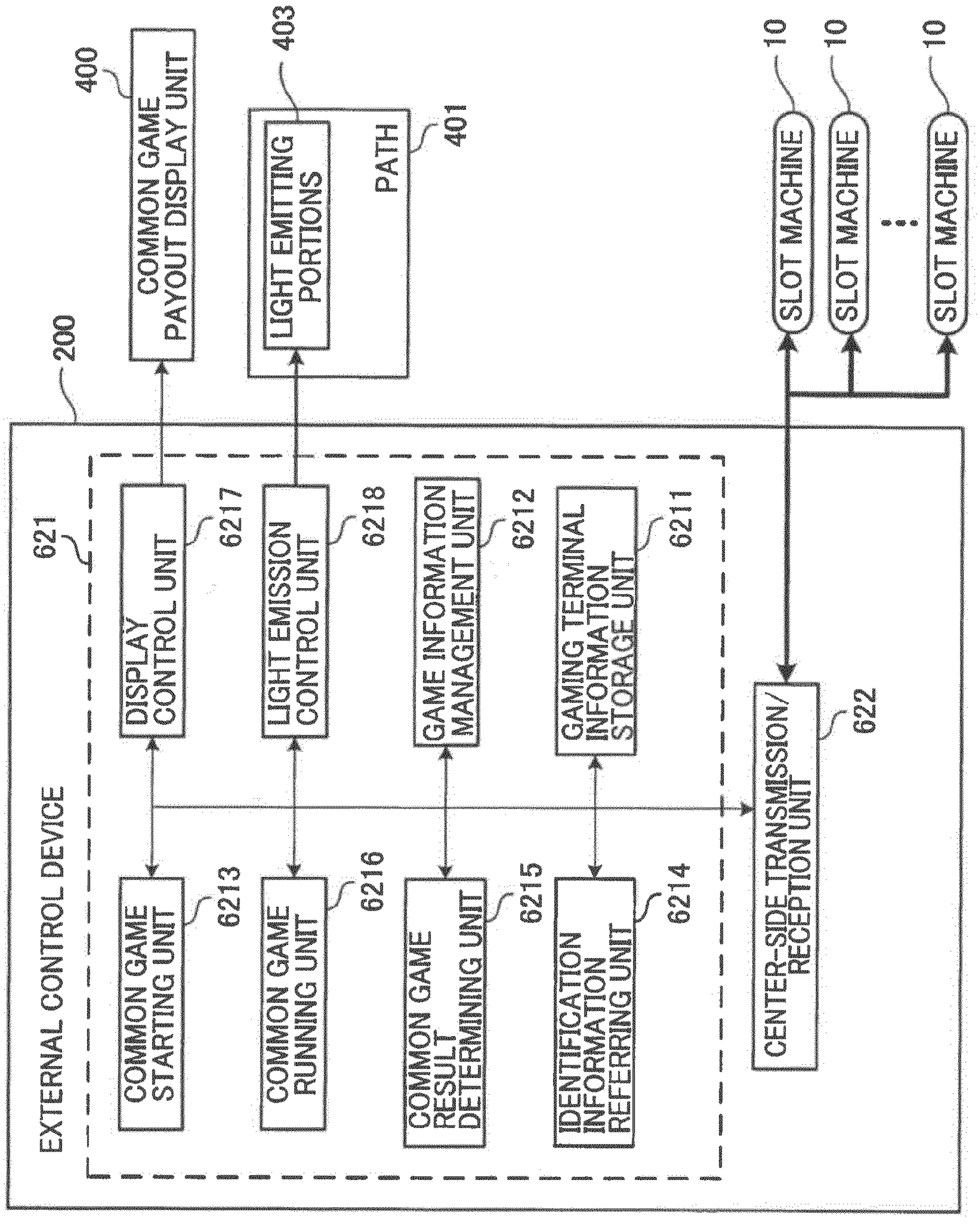
FIG. 3 is a block diagram of an external controller in the gaming machine.

The gaming machine 300 having the above structure includes slot machines 10 and the external controller 200 data-communicably connected to the slot machines 10, as illustrated in FIGS. 2 and 3. The external controller 200 is data-communicably connected to the slot machines 10 installed in a hall.

Each slot machine 10 includes a bet button unit 601, a spin button unit 602, a display unit 614, and a terminal controller 630 which controls these units. Note that the bet button unit 601 and the spin button unit 602 each are a kind of an input device. Further, the slot machine 10 includes a transmission/reception unit 652 which enables data communication with the external controller 200.

The bet button unit 601 has a function of accepting a player's operation for entering a bet amount. The spin button unit 602 has a function of receiving a start of a game such as base game through a player's operation; i.e., start operation. The display unit 614 has a function of displaying, in the form of a still image, various symbols 501, numerical values, marks, or the like, and displaying a moving image such as an effect movie. Further, the display unit 614 includes a touch panel as an input device, and has a function of receiving various commands inputted by player's press operations. The display unit 614 has a symbol display region 614*a*, a video display region 614*b*, and a common game display region 614*c*. The symbol display region 614*a* displays symbols 501, as illustrated in FIG. 1. The video display region 614*b* displays various effect movie information to be displayed during a game, in the form of moving image or still image. The common game display region 614*c* displays therein the common game. Note that the common game display region 614*c* may be formed with the symbol display region 614*a* and a video display region 614*b*. The game display region 614*c* may appear only when the common game is run, in replacement of the symbol display region 614*a* or the image display area 614*b*.

The terminal controller 630 includes: a coin-insertion/start-check unit 603; a base game running unit 605; a bonus game start determination unit 606; a bonus game running unit 607; a random number sampling unit 615; a symbol determining unit 612; an effect-use random number sampling unit 616; an effect determining unit 613; a speaker unit 617; a lamp unit 618; a winning determination unit 619; and a payout unit 620.

The base game running unit 605 has a function of running a base game on condition that the bet button unit 601 is operated. The bonus game start determination unit 606 determines whether to run a bonus game, based on a combination of rearranged symbols 501 resulted from the base game. That is, the bonus game start determination unit 606 has functions of: determining that the player is entitled to a bonus game, when a trigger symbol rearranged satisfies a predetermined condition; and activating the bonus game running unit 607 so as to run a bonus game from the subsequent unit game.

Note that a "unit game" includes a series of operations performed within a period between a start of receiving a bet to a point where a winning may be resulted. For example, bet reception, rearrangement of symbols 501 having been stopped, and payout process to award a payout are performed once each within a single unit game of the base game. Note that a unit game in a base game is referred to as unit base game.

The bonus game running unit 607 has a function of running a bonus game which repeats free games for a number of times equal to the number of games, in response to an operation on the spin button unit 602.

The symbol determining unit 612 has: a function of determining symbols 501 to be rearranged, by using a random number given by the random number sampling unit 615; a function of rearranging selected symbols 501 on the symbol display region 614*a* of the display unit 614; a function of outputting information of the symbols 501 rearranged, to the winning determination unit 619; a function of outputting an effect designation signal to the effect-use random number sampling unit 616, based on the conditions of the rearrangement of the symbols 501.

The effect-use random number sampling unit 616 has functions of, when receiving the effect instruction signal from the symbol determining unit 612, sampling an effect-use random number; and outputting the effect-use random number to the effect determining unit 613. The effect determining unit 613 has: a function of determining an effect by using the effect-use random number; a function of outputting, to the video display region 614*b* of the display unit 614, video information of the effect thus determined; and a function of outputting audio information and illumination information of the effect thus determined to the speaker unit 617 and the lamp unit 618, respectively.

The winning determination unit 619 has a function of determining whether a winning is made when information of symbols 501 rearranged and displayed on the display unit 614 is given; a function of calculating an amount of payout based on a winning combination when it is determined that a winning has been made; and a function of outputting to the payout unit 620 a payout signal which is based on the amount of payout. The payout unit 620 has a function of awarding the player a game value in the form of a coin, a medal, credit, or the like.

Further, the terminal controller 630 has a slot machine boot detection unit 663 and the terminal-side game information storage unit 654. The slot machine boot detection unit 663 detects booting of a slot machine 10, and outputs boot information of that slot machine 10 to the terminal-side game information storage unit 654.

The terminal-side game information storage unit 654 is a device that rewritably stores data of a hard disk device, a memory, or the like. For example, the terminal-side game information storage unit 654 has a function of storing the individual game information or the common game information received from the external controller 200. Further, the terminal-side game information storage unit 654 has a function of transmitting identification information corresponding to the stored common game information to the external controller 200 via the terminal-side transmission/reception unit 652, when boot information is received from the slot machine boot detection unit 663.

The terminal controller 630 has a common game running unit 653. The common game running unit 653 has functions of: outputting a trigger value for each unit base game to the external controller 200 via the terminal-side transmission/reception unit 652; running a common game in response to the common game starting command from the external controller 200, based on the common game information stored in the terminal-side game information storage unit 654; and awarding a payout based on the game result information of the common game received from the external controller 200.

(Functional Block of Gaming Machine 300: External Controller)

The slot machines 10 each structured as described above are connected to the external controller 200. The external controller 200 has a function of remotely controlling and remotely monitoring an operating condition of each slot machine 10 or a process of, for example, changing the configuration of various games such as the common game.

As shown in FIG. 3, the external controller 200 has a center-side transmission/reception unit 622 and a center controller 621. Specifically, the center controller 621 has the gaming terminal information storage unit 6211, a game information management unit 6212, a common game starting unit 6213, a identification information referring unit 6214, a common game result determining unit 6215, the common game running unit 6216, a display control unit 6217, and a light emission control unit 6218.

The gaming terminal information storage unit 6211 accumulatively stores a trigger value of each unit base game transmitted from the slot machine 10. Note that the trigger value transmitted from the slot machine 10 is accumulatively stored in the form of total accumulated value which is an accumulated total of trigger values transmitted from all of the slot machines 10, or in the form of individual accumulated value corresponding to the slot machine 10 having transmitted the trigger value.

Further, the gaming terminal information storage unit 6211 has functions of: storing a threshold of the total accumulated value or the individual accumulated value, which is the condition for starting the common game; and storing the status of use of each slot machine 10 transmitted from the slot machine 10. Note that it is possible that the threshold of the total accumulated value and the threshold of the individual accumulated value are varied, based on the status of use of the slot machine 10.

Further, the gaming terminal information storage unit 6211 has functions of: calculating an amount of payout of the common game based on the total accumulated value or the individual accumulated value; and storing the amount of payout of the common game thus calculated.

The game information management unit 6212 has a function of storing the common game information and the identification information corresponding to the common game information. Note that the game information management unit 6212 may be structured to store a plurality of pieces of common game information, and to automatically select from the plurality of pieces of common game information, a piece of common game information to be transmitted to the slot machines 10, according to the status of use of each slot machine 10 stored in the gaming terminal information storage unit 6211, and time and date.

The common game starting unit 6213 has a function of outputting a common game start signal, when a predetermined condition is met. The common game start signal output is input to the later-described common game running unit 6216. Note that the above mentioned predetermined condition is met when the total accumulated value or the individual accumulated value stored in the gaming terminal information storage unit 6211 equals or surpasses the threshold serving as the condition for starting the common game.

The identification information referring unit 6214 has the following functions. Namely, when a game information requesting command is received from the slot machine 10, the identification information referring unit 6214 compares the identification information contained in the game information requesting command with the identification information contained in the game information management unit 6212. If it is determined that the two pieces of identification information do not match with each other as the result of the comparison, the identification information referring unit 6214 outputs to that slot machine 10 the common game information stored in the game information management unit and the identification information corresponding to that common game information.

The display control unit 6217 has a function of displaying, on the common game payout display unit 400, a payout amount of the common game stored in the gaming terminal information storage unit 6211.

The common game running unit 6216 has a function of outputting the common game starting command to the slot machine 10, which is triggered by the reception of the common game start signal from the common game starting unit 6213. Note that the common game running unit 6216 may be structured to output the common game starting command to all of the slot machines 10 connected and in communication with the external controller 200, or to output the common game starting command to all the slot machines 10 except for those whose corresponding individual accumulated value stored in the gaming terminal information storage unit 6211 is less than the set value (threshold).

The common game running unit 6216 has functions of: obtaining from each slot machine 10 a winning signal indicative of the status of the common game running in the slot machine 10; and outputting the winning signal obtained to the light emission control unit 6218.

The light emission control unit 6218 has a function of causing changes in the status of light emitting portions 403 serially in the direction towards the common game payout display unit 400, based on the winning signal having been received from the common game running unit 6216.

The common game result determining unit 6215 has a function of determining, for each path 401, whether the status of the plurality of light emitting portions 403 is changed all the way up to the common game payout display unit 400. Further, the common game result determining unit 6215 has the following function. Namely, when the common game result determining unit 6215 determines that the status of the light emitting portions 403 of a path 401 has changed all the way up to the common game payout display unit 400, the common game result determining unit 6215 outputs, to the slot machine 10 corresponding to that path 401, game result information of the common game indicating that a payout of the common game will be awarded. To the other slot machines 10, the common game result determining unit 6215 outputs game result information of the common game indicating that no payout of the common game will be awarded.

The center-side transmission/reception unit 622 has a function of enabling data transmission/reception among the slot machines 10.

(Operation of Gaming Machine 300)

Figure 4:
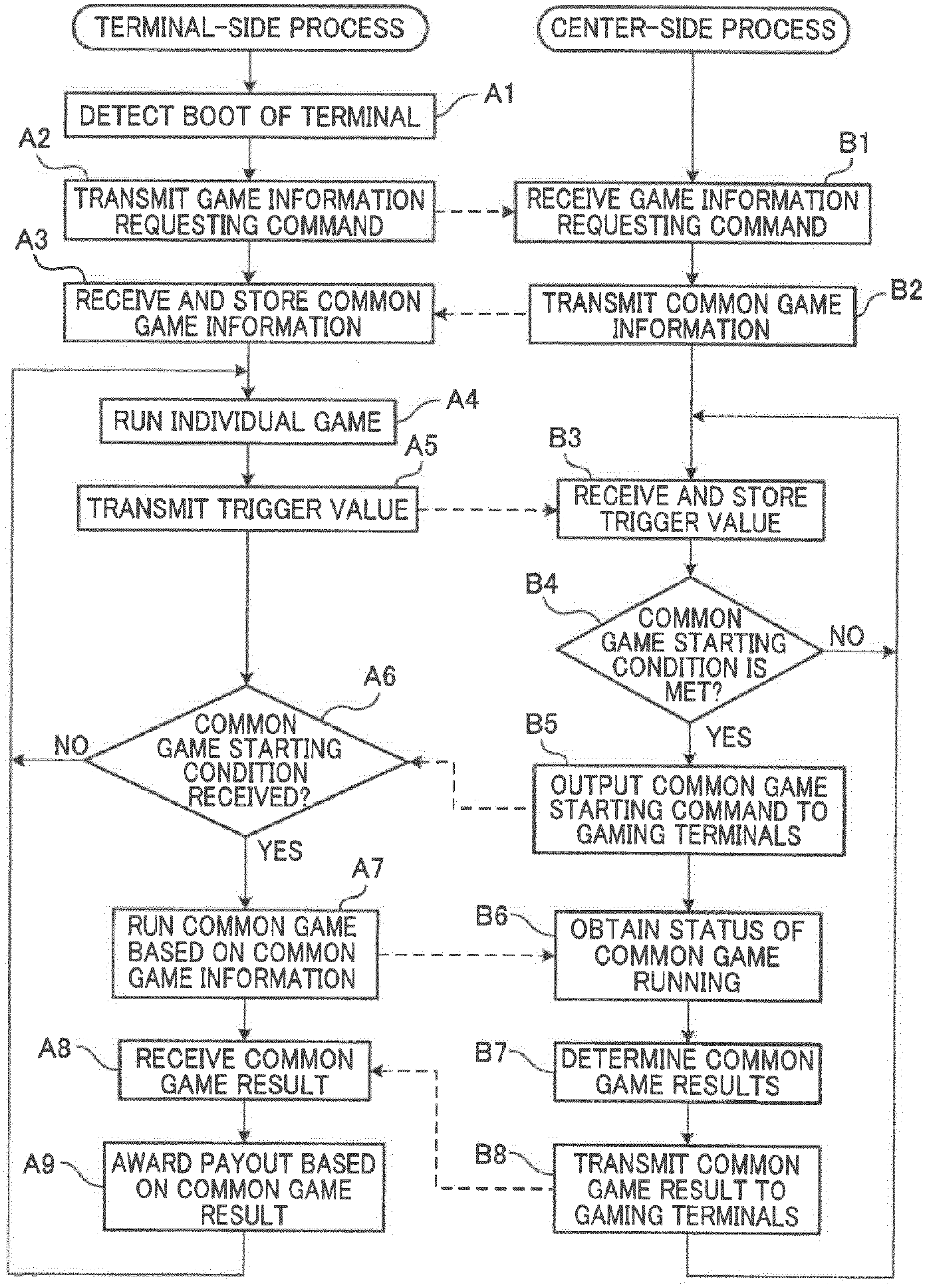
FIG. 4 is a flowchart showing the communication control method of the gaming machine.

With reference to a flowchart of FIG. 4, the following describes an operation of the gaming machine 300 having the above described functional blocks. Note that in the present invention, the "gaming terminal" in the flowchart refers to a slot machine 10 which runs a slot game. The "gaming terminal"; however, is not limited to this.

(Operation of Slot Machine 10)

The slot machine 10 serving as a gaming terminal carries out terminal-side processes (A1) to (A9). Specifically, the boot of the gaming terminal is detected (step A1). Then, a game information requesting command is transmitted to the external controller 200 (step A2). Note that, if the terminal-side game information storage unit 654 stores the common game information, the identification information corresponding to the common game information may be transmitted to the external controller 200.

Next, the common game information is received from the external controller 200, and the common game information is stored in the terminal-side game information storage unit 654 (step A3).

Next, the slot machine 10 runs the base game based on the individual game information stored in the terminal-side game information storage unit 654 (step A3). Specifically, a series of the following operations are performed.

(Coin-Insertion/Start-Check)

First, the slot machine 10 checks if the bet button unit 601 is pressed by a player, and if the spin button unit 602 is subsequently pressed by the player.

(Symbol Determination)

Next, when the player presses the spin button unit 602, the slot machine 10 extracts a random number for symbol determination. Then, for each video reel displayed on the display unit 614, the slot machine 10 determines symbols 501 to be presented to the player when scrolling of symbol columns is stopped.

(Symbol Display)

Next, the slot machine 10 starts scrolling a symbol column of each video reel, and stops the scroll so that the symbols 501 determined are presented to the player.

(Winning Determination)

Next, when the symbol column of each video reel stops scrolling, the slot machine 10 determines whether a combination of the symbols 501 presented to the player relates to a winning.

(Payout)

When the combination of symbols 501 displayed for the player is a combination related to winning, the slot machine 10 offers benefits according to the combination to the player.

For example, when a combination of symbols 501 which relates to a payout of one or more coins, the slot machine pays out the number of coins according to the combination of symbols 501.

Next, whether a bonus combination is formed is determined. When a bonus combination is formed, a bonus game process is run. Meanwhile, when no bonus combination is formed, a base game is run again. During a period of time where the individual game including a base game and a bonus game is run, running status information is transmitted to the external controller 200, the running status information indicating a start and an end of a regular game and the bet amount on a unit game of the base game or the like. This allows the external controller 200 to perform centralized control of each slot machine 10.

Next, the slot machine 10 transmits a trigger value to the external controller 200 for each unit base game (step A5). Next, the slot machine 10 determines whether or not a common game starting command is received from the external controller 200 (step A6).

When the slot machine 10 determines that no common game starting command is received (step A6: NO), the slot machine 10 returns to the process of step A4. On the other hand, when the slot machine 10 determines that the common game starting command is received (step A6: YES), the slot machine 10 runs the common game based on the common game information stored in the terminal-side game information storage unit 654 (step A7).

Next, the slot machine 10 receives the game result information of the common game from the external controller 200 (step A8), and awards a payout based on the game result information of the common game (step A9).

(Operation of External Controller 200)

The external controller 200 runs the following center-side processes of (B1) to (B8) in synchronization with the slot machines 10, while the slot machines 10 are being in operation as described above.

First, the external controller 200 receives the game information requesting command from the slot machine 10 (step B1), and transmits the common game information to the slot machine 10 having transmitted the game information requesting command (step B2). Note that, when the identification information contained in the game information requesting command and the identification information stored in the game information management unit 6212 match with each other, the common game information does not have to be transmitted.

Next, the external controller 200 receives a trigger value from the slot machine 10, and accumulatively adds to the total accumulated value or to the individual accumulated value stored in the gaming terminal information storage unit 6211, the individual accumulated value corresponding to the slot machine 10 having transmitted the trigger value (step B3).

Next, the external controller 200 determines whether or not the total accumulated value or the individual accumulated value stored in the gaming terminal information storage unit 6211 has reached a predetermined threshold (step B4). When the external controller 200 determines that the accumulated value has not yet reached the threshold (step B4: NO), the process returns to step B3. On the other hand, when the external controller 200 determines that the accumulated value has reached the threshold (step B4: YES), the external controller 200 transmits a common game starting command to the plurality of slot machines 10 connected and in communication with the external controller 200 (step B5).

Next, the external controller 200 obtains the status of the common game running from each of the slot machines 10 (step B6), and determines the game result of the common game based on that the status obtained (step B7). Next, the external controller 200 transmits to the plurality of slot machines 10 the game result information indicative of the game result of the common game (step B8).

As described above, the gaming machine 300 includes the slot machines 10 and the external controller 200, each of which slot machines 10 carries out the terminal-side process of (A1) to (A9), and the external controller 200 carries out the center-side processes of (B1) to (B8).

Thus, changing the common game information managed by the game information management device of the external controller 200 will change the common game information of all the slot machines 10 connected and in communication with the external controller 200. This reduces the work required for changing the common game information for use in the common game. Further, the common game information is received from the external controller 200 at the time of booting the slot machine 10. Therefore, the slot machine 10 is able to run the common game based on the common game information immediately after the common game starting command is received from the external controller 200.

[Overview of Game Machine]

Figure 5:
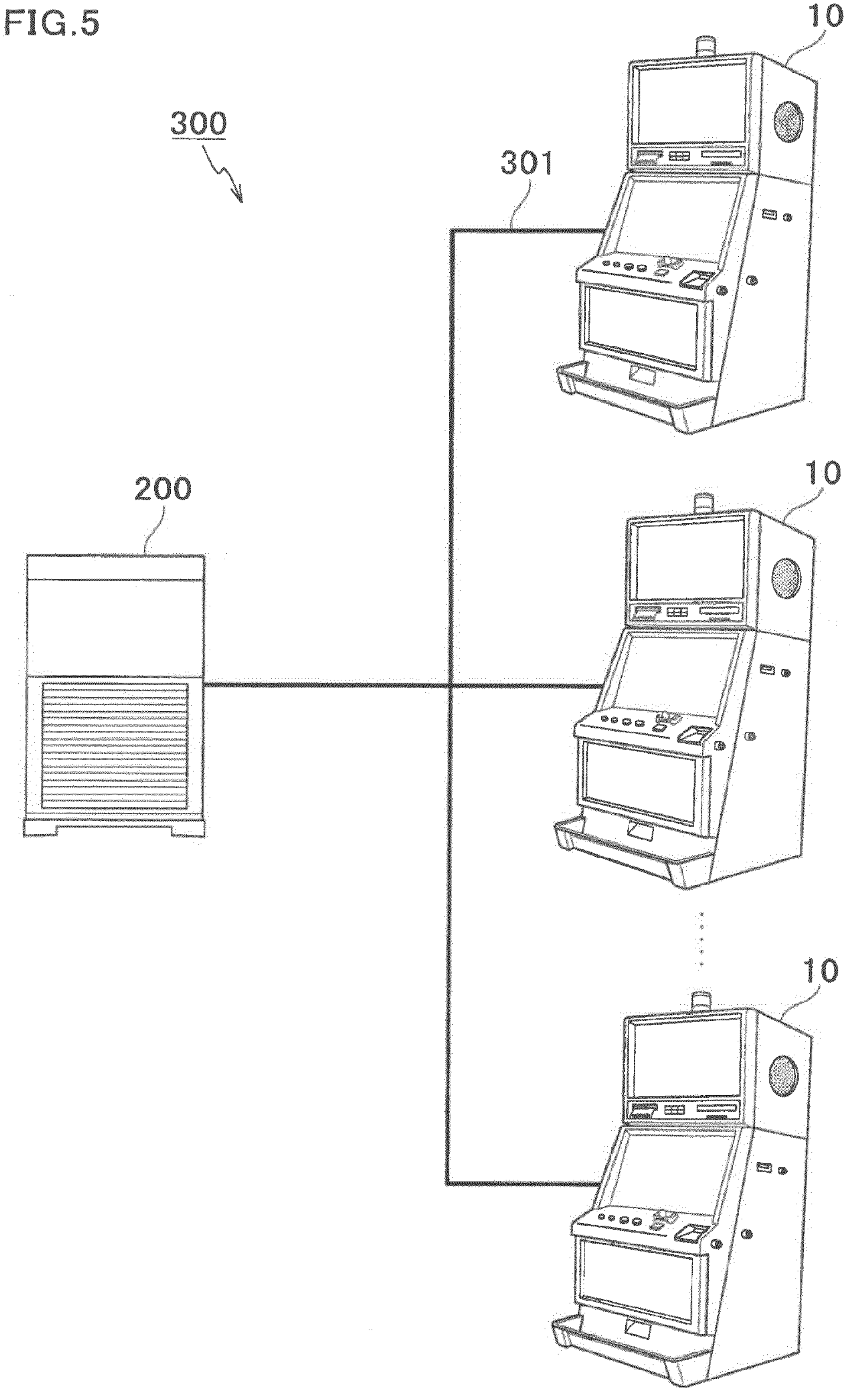
FIG. 5 is a perspective view illustrating the entire gaming machine.
Figure 6:
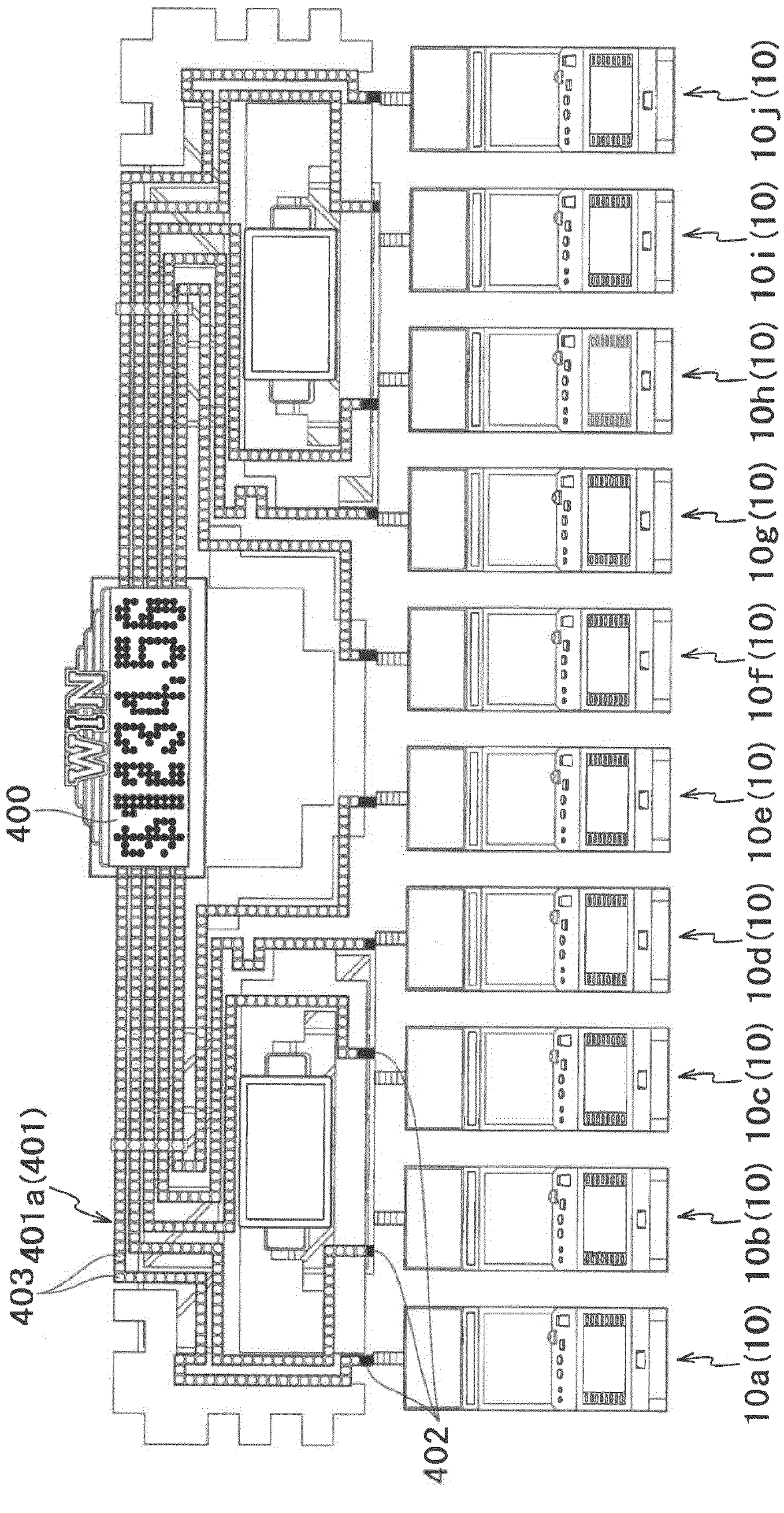
FIG. 6 is a front view of the gaming machine.

Next, with reference to FIG. 5 and FIG. 6, the following describes the structure of the game machine.

As shown in FIG. 5, the gaming machine 300 includes several slot machines 10, and an external controller 200 connected to the slot machines 10 via a communication interface 301.

The external controller 200 is for controlling the slot machines 10. In the present embodiment, the external controller 200 is a so-called hall server provided in a game facility having the slot machines 10. Each slot machine 10 is given a unique identification number. The external controller 200 identifies the source of data from any of the slot machines 10, by referring to this identification number. The identification number is also used for designating the transmission destination, when transmitting data from the external controller 200 to any slot machine 10.

Note that the gaming machine 300 may be built in plural game facilities or a single game facility such as a casino where various games are provided. Further, when building the gaming machine 300 in a single game facility, the system of the gaming machine 300 may be built in each floor or each section of the game facility. The communication interface 301 may be a wired or wireless line, and can adopt a dedicated line, an exchange line or the like.

Further, as shown in FIG. 6, the gaming machine 300 includes: the slot machines 10 each of which individually runs an individual game; a common game payout display unit 400 which displays the amount of payout to be awarded in the common game; and paths 401 each of which includes a plurality of light emitting portions 403 and is formed to connect associated one of the slot machines 10 and the common game payout display unit 400.

The common game payout display unit 400 displays the amount of the payout to be awarded in the common game. In the example shown in FIG. 6, the displayed payout of the common game is $1234.56. The common game payout display unit 400 of the present embodiment is structured by disposing a plurality of LEDs each serving as a light emitting element. However, the common game payout display unit 400 may be a single liquid crystal display. The light emitting element is not limited to LED (light-emitting diode), as long as the element emits light.

Each of the paths 401 is formed by arranging the plurality of light emitting portions 403 so as to connect associated one of the slot machines 10 and the common game payout display unit 400. As shown in FIG. 6, the path 401*a* extends from a position 402 corresponding to a slot machine 10*a* to the common game payout display unit 400.

Each of the light emitting portions 403 is an LED, and is a member capable of lighting in a plurality of colors. The light emitting portions 403 are controlled so that the status of the light emitting portions 403 changes from the position 402 corresponding to associated one of the slot machines 10 towards the common game payout display unit 400.

Note that that the light emitting portion 403 is not limited to LED, provided that the light emitting portion 403 emits light. The change in the status of the light emitting portions 403 is not limited to a change from the non-lighting state to the lighting state, and may be a change from the non-flashing state to the flashing state, or a change in the color of light emitted. Further, the light emitting portion 403 may be capable of lighting only in one color; however, it is preferable that the light emitting portion 403 be capable of lighting in different colors to enable wider variety of effects.

[Overall Structure of Slot Machine]

Figure 7:
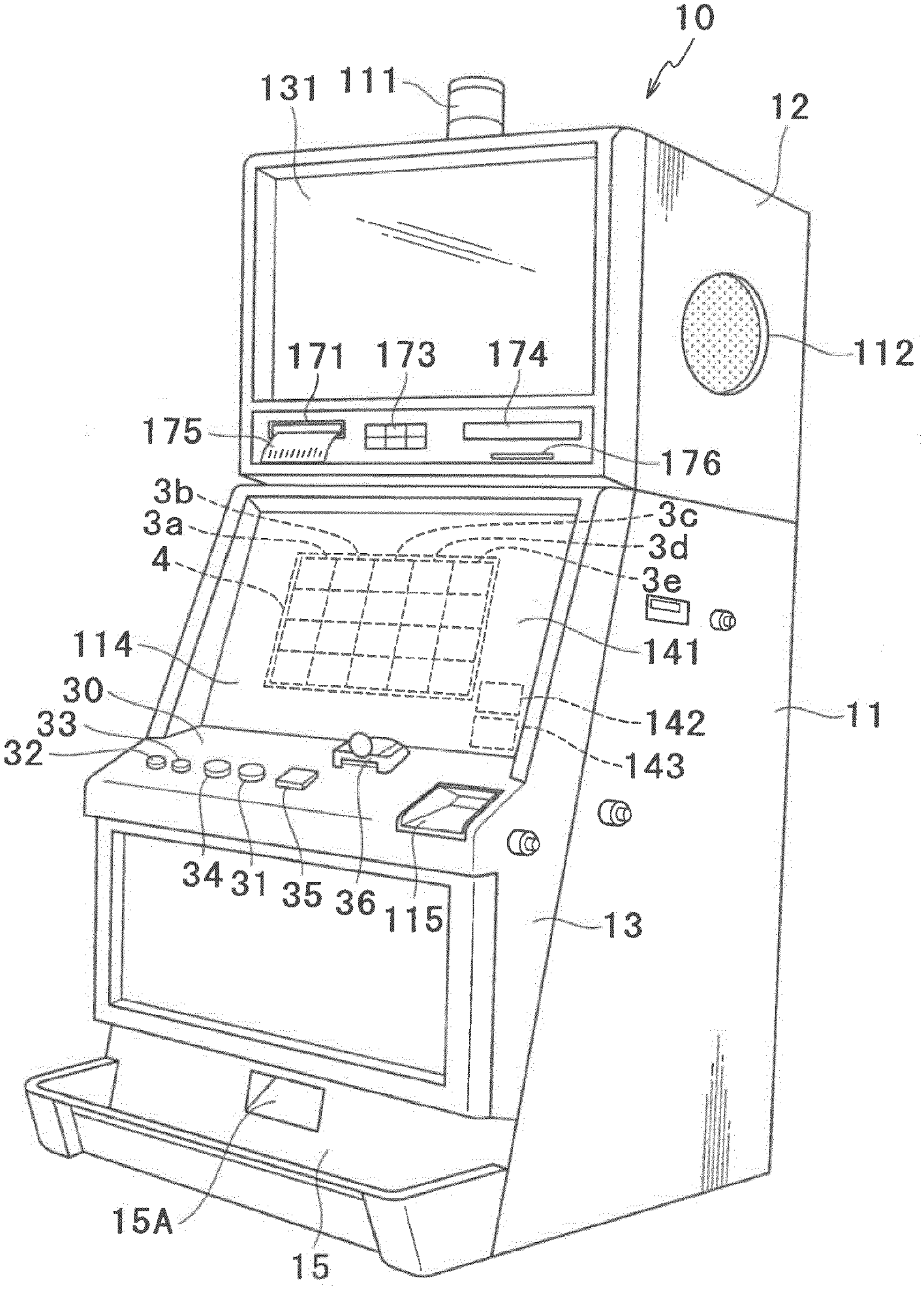
FIG. 7 is a perspective view showing the exterior appearance of the slot machine in the gaming machine.

The structure of the gaming machine 1 has been described above. Next, the following describes the overall structure of the slot machine, with reference to FIG. 7. FIG. 7 is a view showing the overall structure of the slot machine according to the embodiment of the present invention.

The slot machine 10 includes: a cabinet 11, a top box 12 provided above the cabinet 11, and a main door 13 provided on the front surface of the cabinet 11.

A lower image display panel 141 is provided at the center of the main door 13. The lower image display panel 141 includes a liquid crystal panel, and forms the display. The lower image display panel 141 has a main display 101 and a sub display 102. The main display 101 has a symbol display region 4. In the symbol display region 4, five video reels 3 (3*a*, 3*b*, 3*c*, 3*d*, 3*e*) are displayed. In the present embodiment, a video reel depicts through videos the rotational and stop motions of a mechanical reel having a plurality of symbols drawn on the peripheral surface thereof. To each of the video reels 3, a symbol column comprised of a previously determined plurality (22 in the present embodiment) of symbols 180 is assigned (see FIGS. 10 and 13 which is described later).

In the symbol display region 4, the symbol columns assigned to the respective video reels 3 are separately scrolled, and are stopped after predetermined time has elapsed. As a result, a part (four consecutive symbols in the present embodiment) of each of the symbol columns is displayed for the player. The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line L. It is to be noted that any desired shape of the winning line L can be adopted, and examples of the shape of the winning line L may include a straight line formed by connecting the upper central regions for the respective video reels 3, a V-shaped line, and a bent line. Also, any desired number of winning lines L can be adopted, and the number can be for example 30 lines.

Further, the lower image display panel 141 has a number-of-credits display region 142 and a number-of-payouts display region 143. The number-of-credits display region 142 displays the number of coins (hereinafter also referred to as "the number of credits") owned by the player and retained inside the slot machine 10. The number-of-payouts display region 143 displays the number of coins (hereinafter also referred to as "the number of payouts") to be paid out to the player when winning is established.

Further, the lower image display panel 141 has a touch panel 114. The player is able to input various instructions by touching the lower image display panel 141.

On the lower side of the lower image display panel 141, there are arranged various buttons set in a control panel 30, and various devices to be operated by the player.

A spin button 31 is used when starting scrolling of the symbol columns of the respective video reels 3. A change button 32 is used when requesting a game facility staff member to exchange money. A CASHOUT button 33 is used when paying out the coins retained inside the slot machine 10 to a coin tray 15.

A 1-BET button 34 and a maximum BET button 35 are used for determining the number of coins (hereinafter also referred to as "the number of BETs") to be used in the game from the coins retained inside the slot machine 10. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The slot machine 10 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the slot machine 10, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player. When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Circuit Structure of Gaming Machine]

The overall structure of the slot machine 10 has been described above. Next, with reference to FIG. 8 and FIG. 9, a structure of a circuit included in the gaming machine is described.

[Circuit Structure of Slot Machine]

Figure 8:
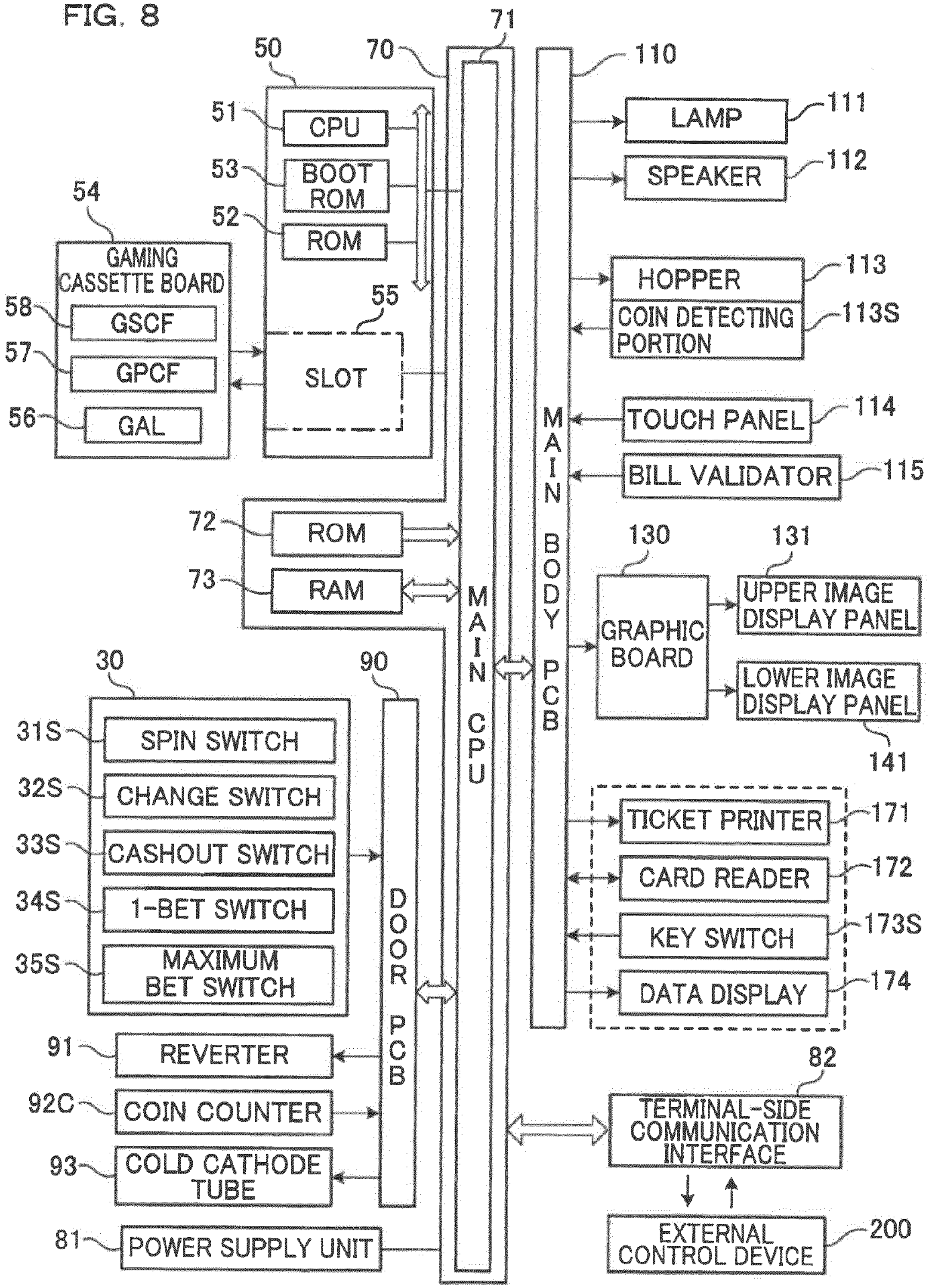
FIG. 8 is a block diagram showing the electric structure of the gaming terminal.

FIG. 8 is a block diagram showing an internal structure of the slot machine serving as the gaming terminal of the gaming machine, according to the embodiment of the present invention.

The gaming board 50 includes a CPU 51, a ROM 52, and a boot ROM 53 which are connected to one another via an internal bus; and a slot 55 corresponding to a gaming cassette board 54.

The gaming cassette board 54 has a game program CF (GPCF), and a game system program CF 58 (GSCF), and a GAL 56 (Generic Array Logic).

The GSCF 58 stores a game system program. The GPCF stores an individual game program (individual game information). The individual game program includes a program related to the individual game progression, a lottery program, and a program for producing effects by images and sounds (e.g. see FIGS. 15 to 27 which are described later). Further, the aforementioned individual game program includes data (see FIG. 10) specifying the configuration of the symbol column assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol column. The slot machine of the present embodiment determines as the to-be stopped symbol the symbol to be displayed in a predetermined region (e.g. the upper region) out of the four regions provided for each of the video reels 3 of the symbol display region 4.

The aforementioned lottery program includes symbol determination data. The symbol determination data is data that specifies random numbers so that each of the 22 symbols (code numbers from "00" to "21") forming the symbol column is determined at an equal probability (i.e. 1/22), for each video reel 3. The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 10 showing the symbol columns of the individual game, the symbol column of the first video reel 3*a* includes one symbol of "STRAWBERRY", and includes eight symbols of "ORANGE". Hence, the former is determined at the probability of "1/22", whereas the latter is determined at the probability of "8/22".

Further, the GPCF 57 stores a program necessary in the common game, other than the common game information received from the external controller 200. That is, in the present embodiment, the common game is run by using the common game information and the program for the common game, stored in the GPCF 57. The common game information received from the external controller 200 includes, for example, data (see FIG. 13) defining the symbol columns assigned to each of the video reels 3 in the common game, and a symbol combination table (see FIG. 14) defining the payout of the common game. Note that the program of the common game, stored in the GPCF 57, may be a program identical to the individual game program stored in the GPCF 57 or a program that uses a part of the individual game program.

It is to be noted that, although the data specifies that the equal numbers of symbols be provided to form the symbol columns of the respective video reels 3 as shown in FIG. 10 and FIG. 13 in the present embodiment, different numbers of symbols may form the respective video reels 3. For example, the symbol column of the first video reel 3*a* may include 22 symbols whereas the symbol column of the second video reel 3*b* may include 30 symbols. Such a structure increases the degree of freedom in setting the probabilities of the respective types of symbols being determined for each video reel 3.

Further, the slot 55 is capable of accommodating therein the gaming cassette board 54, and is capable of connecting to the gaming cassette board 54 in such a manner that the game program is readable from the GPCF 57 and the game system program is readable from the GSCF 58.

The GAL 56 is a type of PLD (Programmable Logic Device) having a fixed OR array structure. The GAL 56 is provided with a plurality of input ports and output ports, and predetermined input into the input port causes output of the corresponding data from the output port.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (tamper check program) for authenticating the individual game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a terminal-side communication interface 82.

The ROM 72 includes a memory device such as a flash memory, and stores a program such as BIOS to be performed by the main CPU 71, and permanent data. When the BIOS is performed by the main CPU 71, a process for initializing predetermined peripheral devices is performed. Further, there is started a process of loading the individual game program, the game system program, and the common game program stored in the GPCF 57 and the GSCF 58 through the gaming board 50.

The RAM 73 stores data and programs which are used in operation of the main CPU 71. For example, when the process of loading the aforementioned game program, game system program or authentication program is performed, the RAM 73 can store the program. The RAM 73 is provided with working areas used for operations in execution of these programs. Examples of the areas include: an area that stores the number of individual games, the number of BETs, the number of payout, the number of credits and the like; and an area that stores symbols (code numbers) determined by lottery.

In the RAM 73 is stored the common game information received from the external controller.

The terminal-side communication interface 82 is for communicating with the external controller 200 such as a server, through the communication interface 301. Further, the motherboard 70 is connected with a later-described door PCB (Printed Circuit Board) 90 and a body PCB 110 by respective USBs. The motherboard 70 is also connected with a power supply unit 81. When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 flashes based on a control signal output from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71*a* signal corresponding to the detected place. Upon acceptance of a valid bill, the bill validator 115 outputs to the main CPU 71*a* signal corresponding to the face amount of the bill.

The graphic board 130 controls display of images performed by the respective upper image display panel 131 and lower image display panel 141, based on a control signal outputted from the main CPU 71. The symbol display region 4 of the lower image display panel 141 displays the five video reels 3 by which the scrolling and stop motions of the symbol columns included in the respective video reels 3 are displayed. The graphic board 130 is provided with a VDP generating image data, a video RAM temporarily storing the image data generated by the VDP, and the like. The number-of-credits display region 142 of the lower image display panel 141 displays the number of credits stored in the RAM 73. The number-of-payouts display region 143 of the lower image display panel 141 displays the number of payouts of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the GPCF 57 and stored into the RAM 73.

Based on a control signal outputted from the main CPU 71, the ticket printer 171 prints on a ticket a barcode representing encoded data of the number of credits stored in the RAM 73, date, the identification number of the slot machine 10, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Circuit Structure of External Controller]

Figure 9:
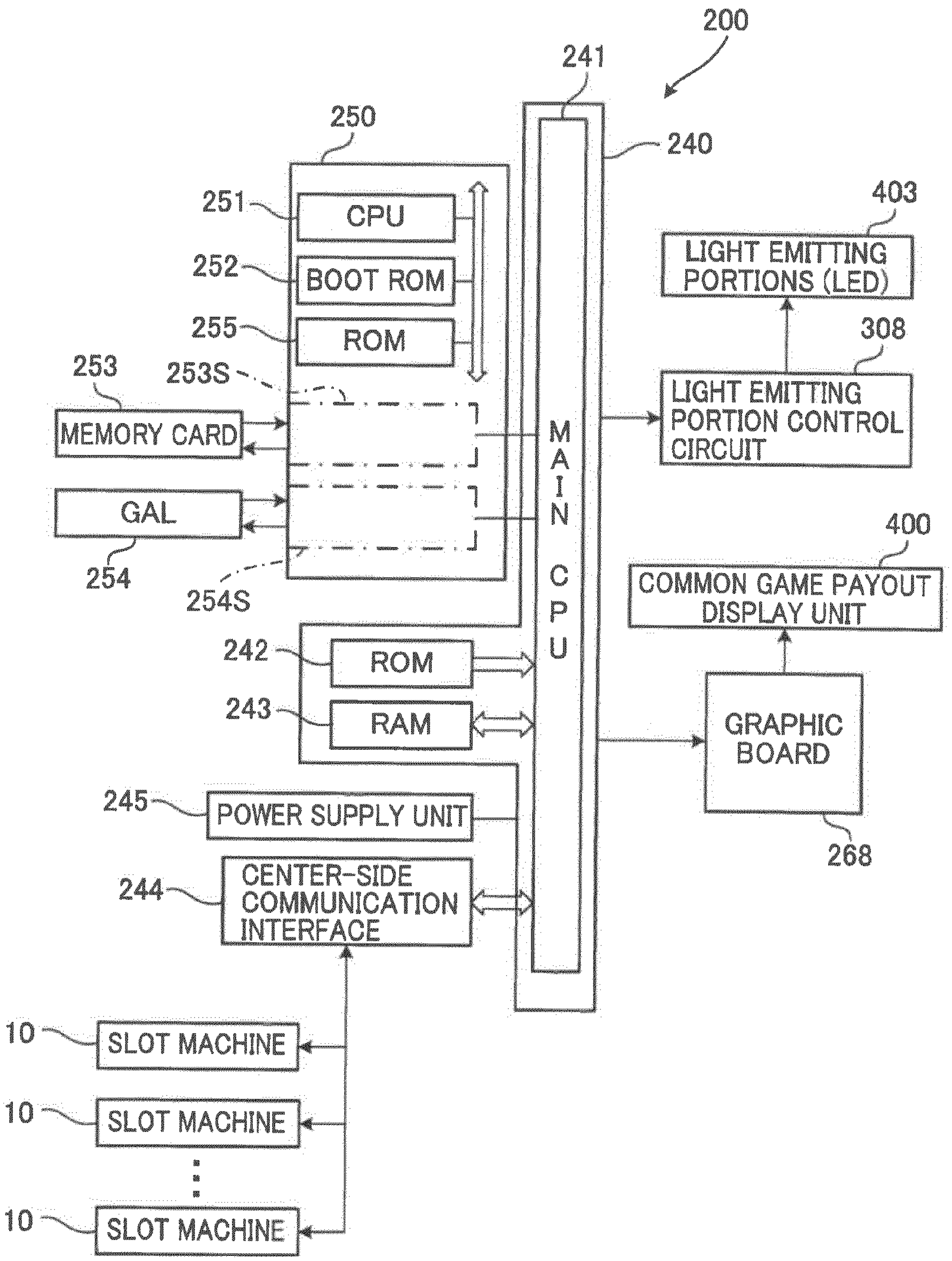
FIG. 9 is a block diagram showing an electric structure of the external controller.

FIG. 9 is a block diagram showing an electrical structure of the external controller 200. The external controller 200 is provided therein with a control unit. The control unit includes a motherboard 240, a gaming board 250, a power supply unit 245, and the like.

The gaming board 250 includes a main CPU 241, a ROM 255, a boot ROM 252, a card slot 253S corresponding to a memory card 253, and an IC socket 254S corresponding to a GAL 254. In the memory card 253 is stored the common game information, the identification information corresponding to the common game information. Note that the common game information stored in the memory card 253 is not limited to one type, and a plurality of types of common game information may be stored.

The motherboard 240 has the same structure as the motherboard 40 of the slot machine 10. That is, the motherboard 240 includes a main CPU 241, a ROM 242, and a RAM 243. The communication unit 244 is for carrying out communication with the slot machines 10 through a communication interface 301.

In the RAM 243 is stored the total accumulated value or the individual accumulated value, which is an accumulated value of the trigger values received from the slot machines 10. Further, the RAM 243 stores the threshold serving as the condition for staring the common game.

The graphic board 268 has the same structure as the graphic board 68 of the slot machine 10; however, the graphic board 268 differs from the graphic board 68 in that the former controls an image display on the common game payout display unit 400 based on a control signal outputted from the main CPU 241.

The light emitting portion control circuit 308 controls activation of LEDs serving as the light emitting portions 403, and changes the status of the light emitting portions 403 based on a control signal output from the main CPU 241.

[Symbol Columns of Video Reels in Individual Game]

The circuit structure of the gaming machine has been described above. Next, with reference to FIG. 10, a structure of the symbol columns included in the video reels 3 of the slot machine 10 in the individual game is described. FIG. 10 is a view showing arrangement of symbols that are drawn on the peripheral surfaces of the reels of the slot machine in the individual game, according to the embodiment of the present invention.

A first video reel 3*a*, a second video reel 3*b*, a third video reel 3*c*, a fourth video reel 3*d*, and a fifth video reel 3*e* each is assigned with a symbol column consisting of 22 symbols that correspond to respective code numbers from "00" to "21".

Types of the symbols provided are "BLUE 7", "BELL", "CHERRY", "STRAWBERRY", "PLUM", "ORANGE" and "APPLE".

[Symbol Combination Table for Individual Game]

Next, with reference to FIG. 11, a symbol combination table for the individual game is described. FIG. 11 shows a symbol combination table of the slot machine for the individual game according to the embodiment of the present invention.

The symbol combination table specifies combinations of drawn symbols relating to winning, and the number of payouts. On the slot machine 10, the scrolling of symbol columns of the respective video reels 3 is stopped, and winning is established when the combination of symbols displayed along the winning line L matches one of the combinations of symbols specified by the symbol combination table. According to the winning combination, a benefit such as payout of coins or start of a bonus game is offered to the player. It is to be noted that winning is not established (i.e. the game is lost) when the combination of symbols displayed along the winning line L does not match any of the combinations of symbols specified by the symbol combination table.

Basically, winning is established when all symbols displayed along the winning line L by the respective video reels 3 are of one type out of, "APPLE", "BLUE 7", "BELL", "CHERRY", "STRAWBERRY", "PLUM" and "ORANGE".

However, with respect to the respective types of symbols of "CHERRY" and "ORANGE", winning is also established when one or three symbols of either type are displayed along the winning line L by the video reels 3. For example, when all the symbols displayed along the winning line L by all the video reels 3 are "BLUE 7", the winning combination is "BLUE", and "10" is determined as the number of payouts. Based on the determined number of payouts, payout of coins is performed. The payout of coins is performed by actually discharging coins from the coin payout exit 15A or adding the determined number of payouts to the number of credits, or issuing a ticket with a barcode.

"APPLE" is a symbol related to the bonus game trigger. When all the symbols displayed along the winning line L by all the video reels 3 are "APPLE", the winning combination is "bonus game trigger", and bonus games start from the next game.

[Common Game]

Figure 12:
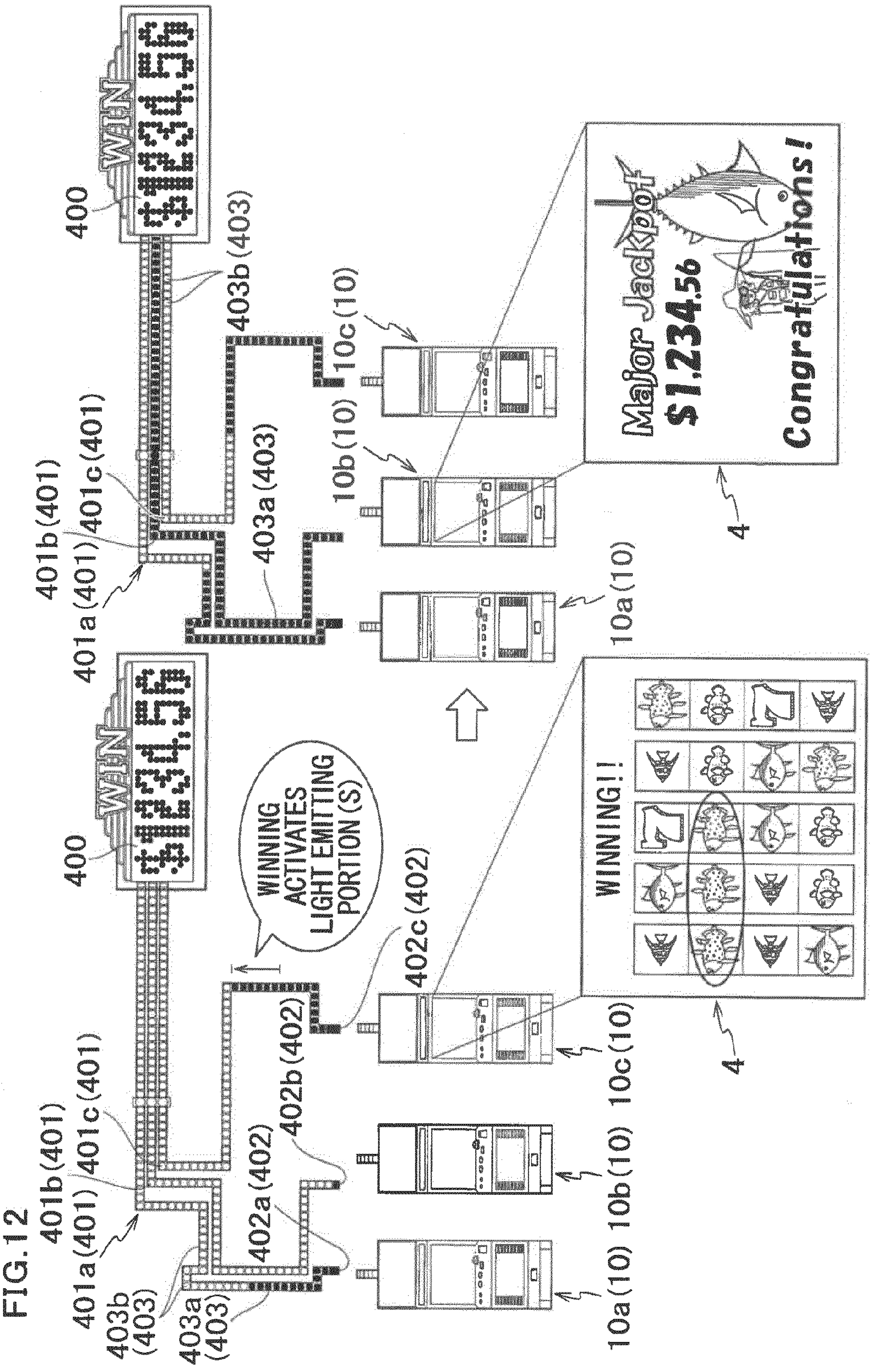
FIG. 12 is an explanatory diagram explaining a common game.

Next, the following schematically describes the common game of the embodiment of the present invention, with reference to FIG. 12.

The common game starts when the total accumulated value or the individual accumulated value stored in the RAM 243 of the external controller 200 reaches the threshold. During the common game, the a plurality of symbols 180 of the common game is rearranged in the symbol display region 4 of each slot machine 10. When a predetermined winning combination is achieved by the plurality of symbols 180 rearranged in any slot machine 10, the status of the light emitting portions 403 changes serially from the position 402 corresponding to that slot machine 10 towards the common game payout display unit 400. This operation is repeated until the status of the plurality of light emitting portions 403 in any one of the paths 401 changes all the way up to the common game payout display unit 400. Note that the light emitting portions 403 whose respective states changed from the non-lighting state to the lighting state are denoted by the reference numeral 403*a*. The light emitting portions 403*b* are the light emitting portions 403 whose respective states have not changed.

As shown in FIG. 12, when the status of the plurality of light emitting portions 403 of any path 401 changed all the way up to the common game payout display unit 400, the payout displayed on the common game payout display unit 400 is awarded through the slot machine 10 corresponding to that path 401. In the example shown in FIG. 12, the status of the light emitting portions 403 in the path 401*b* (401) has changed all the way up to the common game payout display unit 400. Therefore, the payout of the common game is awarded through the slot machine 10*b* (10) corresponding to the path 401*b*(401).

[Symbol Columns of Video Reels for Common Game]

Next, with reference to FIG. 13, a structure of the symbol columns included in the video reels 3 of the slot machine 10 in the common game is described. FIG. 13 shows arrangement of symbols that are drawn on the peripheral surfaces of the reels of the slot machine in the common game according to the embodiment of the present invention.

A first video reel 3*a*, a second video reel 3*b*, a third video reel 3*c*, a fourth video reel 3*d*, and a fifth video reel 3*e* each is assigned with a symbol column including 22 symbols that correspond to respective code numbers from "00" to "21", as in the case of symbol columns of FIG. 10 for the individual game.

The types of symbol include: "Angelfish", "Clownfish", "7", "Tuna", and "Coelacanth".

[Symbol Combination Table for Common Game]

Next, with reference to FIG. 14, a symbol combination table for the common game is described. FIG. 14 shows a symbol combination table of the slot machine for use in the common game, according to the embodiment of the present invention.

The symbol combination table for the common game defines the combinations of symbols related to a winning, the number of payouts, and the number of light emitting portions 403 whose respective states are changed serially towards the common game payout display unit 400. On the slot machine 10, the scrolling of symbol columns of the respective video reels 3 is stopped, and winning is established when the combination of symbols displayed along the winning line L matches one of the combinations of symbols specified by the symbol combination table for the common game. According to the winning combination, a benefit such as payout of coins is offered to the player. It is to be noted that winning is not established (i.e. the game is lost) when the combination of symbols displayed along the winning line L does not match any of the combinations of symbols specified by the symbol combination table.

A winning is achieved when three or more of the same symbol out of "Angelfish", "Clownfish", "7", "Tuna", and "Coelacanth" are displayed on the winning line L. For example, if three "Angelfish" symbols are displayed on the winning line L, the number of payouts is determined as to be "12" and the number of light emitting portions 403 whose respective states are serially changed towards the common game payout display unit 400 is determined as to be "6". Based on the determined number of payouts, payout of coins is performed. Further, the states of six light emitting portions 403 in the path 401 corresponding to that slot machine 10 are changed.

[Contents of Program]

Figure 28:
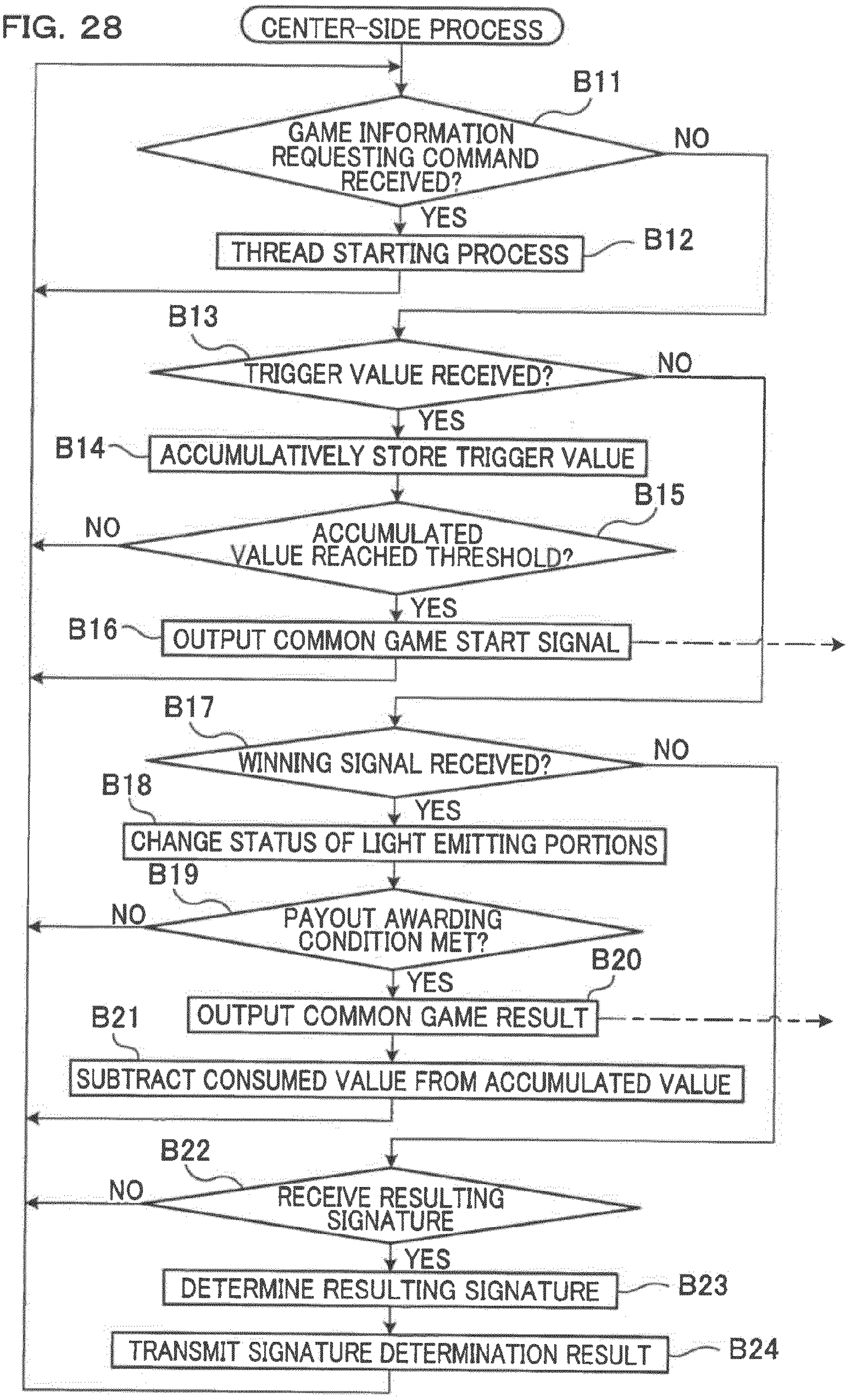
FIG. 28 is a flowchart showing a center-side process routine performed in an external controller.
Figure 29:
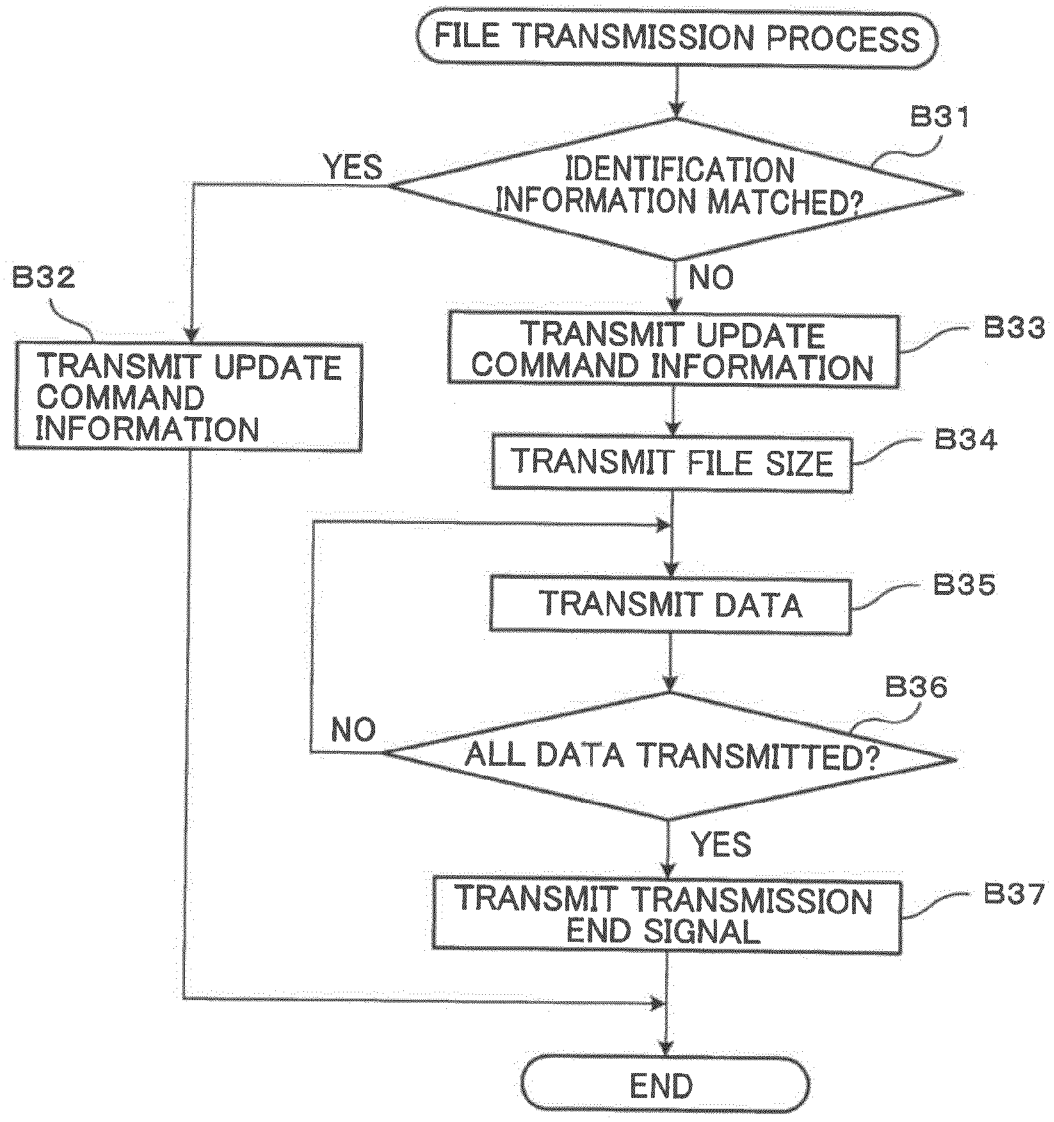
FIG. 29 is a flowchart showing a file transmission process routine performed in the external controller.

The symbol combination table for the common game has been described above. Next, with reference to FIGS. 15 to 29, programs to be run in the gaming machine 300 is described. FIGS. 15 to 27 shows a program run in the slot machine 10, and FIGS. 28 and 29 shows a program run in the external controller 200.

<Terminal-Side Process>

Figure 15:
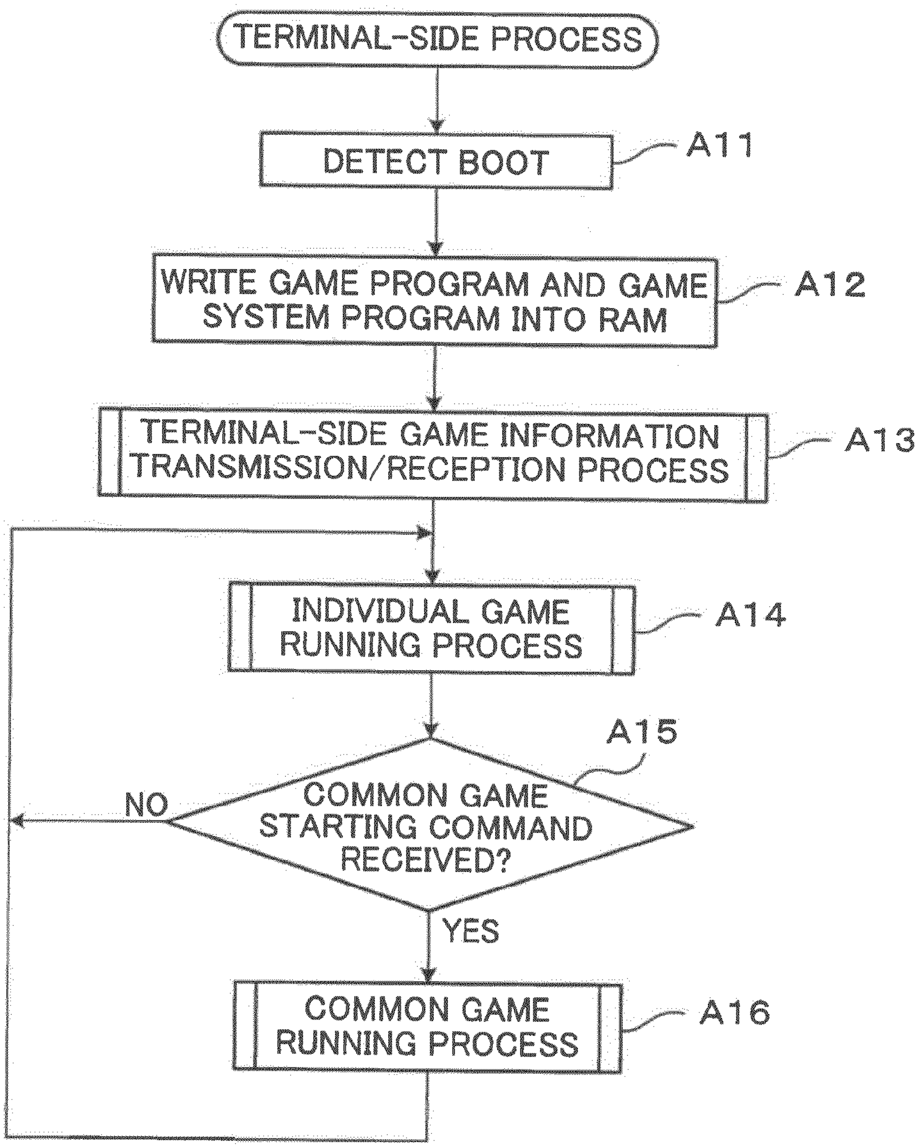
FIG. 15 is a flowchart showing a terminal-side process routine performed in the gaming terminal.

First described with reference to FIG. 15 is a terminal-side process. FIG. 15 is a flowchart of a terminal-side process run in the slot machine of the gaming machine, according to the embodiment of the present invention.

First, the main CPU 71 detects a boot of the slot machine 10 (step A11). Next, the authenticated game system program, a unit game program (the individual game information), and the common game program are read out from the GPCF 57 and the GSCF 58 via the gaming board 50, and are written into the RAM 73 (step A12).

Figure 16:
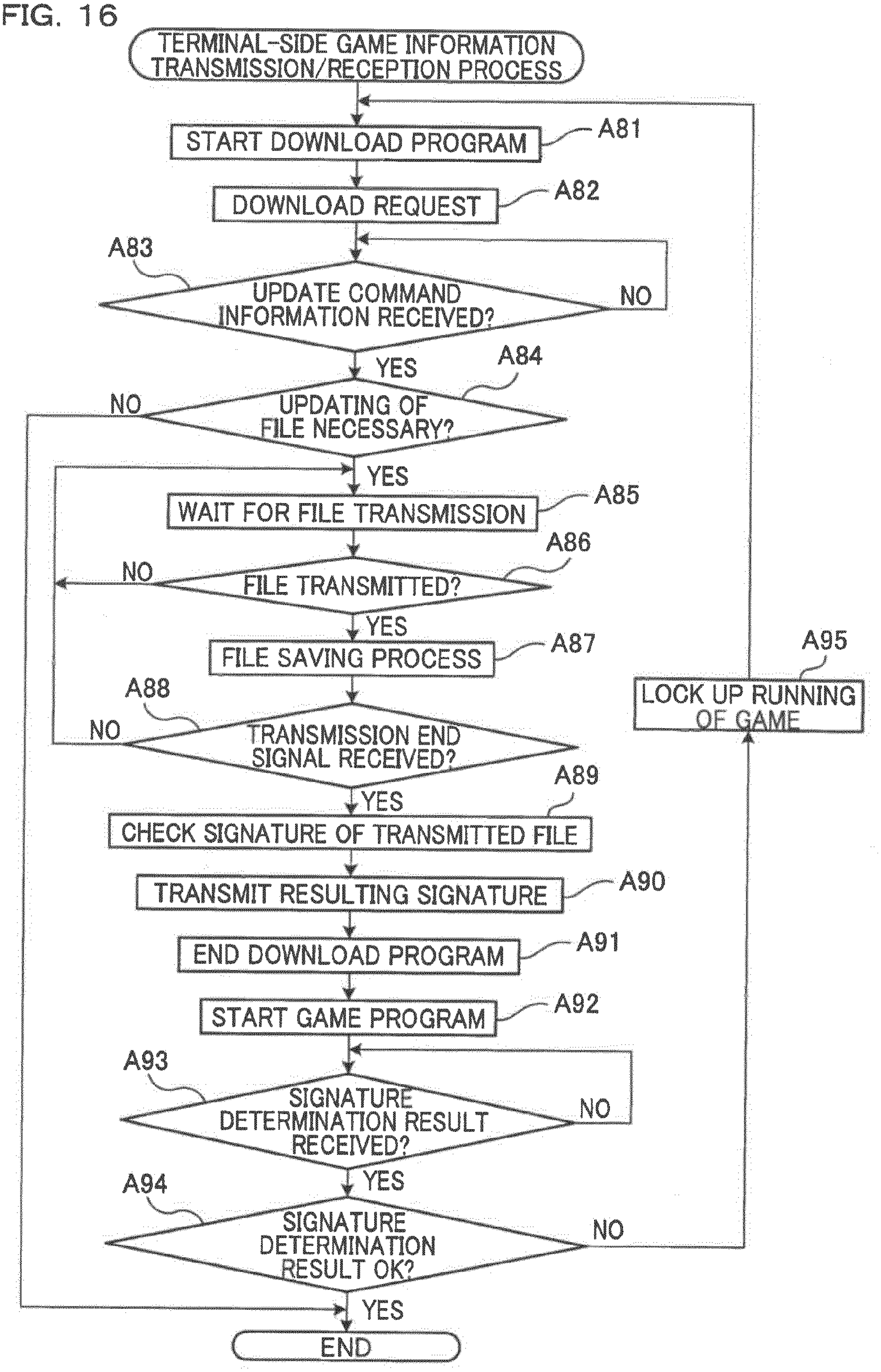
FIG. 16 is a flowchart showing a terminal-side game information transmission/reception process routine performed in the gaming terminal.

Next, the main CPU 71 performs a terminal-side game information transmission/reception process which is described layer with reference to FIG. 16 (step A13). In this process, for example, the common game information is received from the external controller 200.

Next, the main CPU 71 performs an individual game running process which is described later with reference to FIG. 17 (step A14). Next, the main CPU 71 determines whether or not a common game starting command is received from the external controller 200 (step A15). If the main CPU 71 determines that no common game starting command is received (step A15: NO), the process returns to step A14. On the other hand, when the main CPU 71 determines that the common game starting command is received (step A15: YES), the main CPU 71 performs a common game running process described later with reference to FIG. 27 (step A16). The process then returns to step A14.

<Terminal-Side Game Information Transmission/Reception Process>

Next, with reference to FIG. 16, the following describes the terminal-side game information transmission/reception process.

First, the main CPU 71 starts a download program for receiving the common game information from the external controller 200 (step A81), and performs a download request in which a game information requesting command containing the identification information of the common game information stored in the RAM 73 is transmitted to the external controller 200 (step A82). Note that, if RAM 73 stores no common game information, the game information requesting command transmitted to the external controller 200 contains information that no common game information is stored.

Next, the main CPU 71 determines whether or not update command information is received from the external controller 200 (step A83). The update command information indicates whether to update the common game information stored in the RAM 73. If the main CPU 71 determines that no update command information is received (step A83: NO), the process returns to step A83.

On the other hand is the main CPU 71 determines that the update command information is received (step A83: YES), the main CPU 71 determines whether to update the common game information stored in the RAM 73, based on the update command information (step A84). When the main CPU 71 determines not to update the common game information (step A84: NO), this process routine ends.

On the other hand, when the main CPU 71 determines to update the common game information (step A84: YES), the main CPU 71 enters the standby mode to wait for the common game information file from the external controller 200 (step A85). Next, the main CPU 71 determines whether or not a common game information file is received from the external controller 200 (step A86). When the main CPU 71 determines that no common game information files is received (step A86: NO), the process returns to step A85. On the other hand, when the main CPU 71 determines that a common game information file is received (step A86: YES), the main CPU 71 performs a file saving process to store the file in the RAM 73 (step A87).

Next, the main CPU 71 determines whether or not a transmission end signal indicating the transmission end of the common game information file is received from the external controller 200 (step A88). When the main CPU 71 determines that no transmission end signal is received (step A88: NO), the process returns to step A85.

On the other hand, if the main CPU 71 determines that the transmission end signal is received (step A88: YES), the main CPU 71 performs a signature checking whereby the signature is extracted from the common game information file (step A89). The signature extracted is then transmitted to the external controller 200 as a resulting signature (step A90).

Next, the main CPU 71 ends the download program (step A91), and starts the game program (step A92).

Next, the main CPU 71 determines whether or not a signature determination result is received from the external controller 200 (step A93), the signature determination result indicating the presence of any fraud such as tampering of data in the file during the communication between the slot machine 10 and the external controller 200. When the main CPU 71 determines that the signature determination result is not received (step A93: NO), the process returns to step A93.

On the other hand, when the main CPU 71 determines that the signature determination result is received (step A93: YES), the main CPU 71 determines whether or not the signature determination result indicates that the common game information file received from the external controller 200 is a fraud-free file (step A94). When the main CPU 71 determines that the common game information file is fraud-free (step A94:YES), the main CPU 71 ends this process routine. On the other hand, when the main CPU 71 determines that the common game information file is not fraud-free (step A94:NO), the main CPU 71 prohibits running of the common game based on the common game information file (step A95), and the process returns to step A81.

<Individual Game Running Process>

Figure 17:
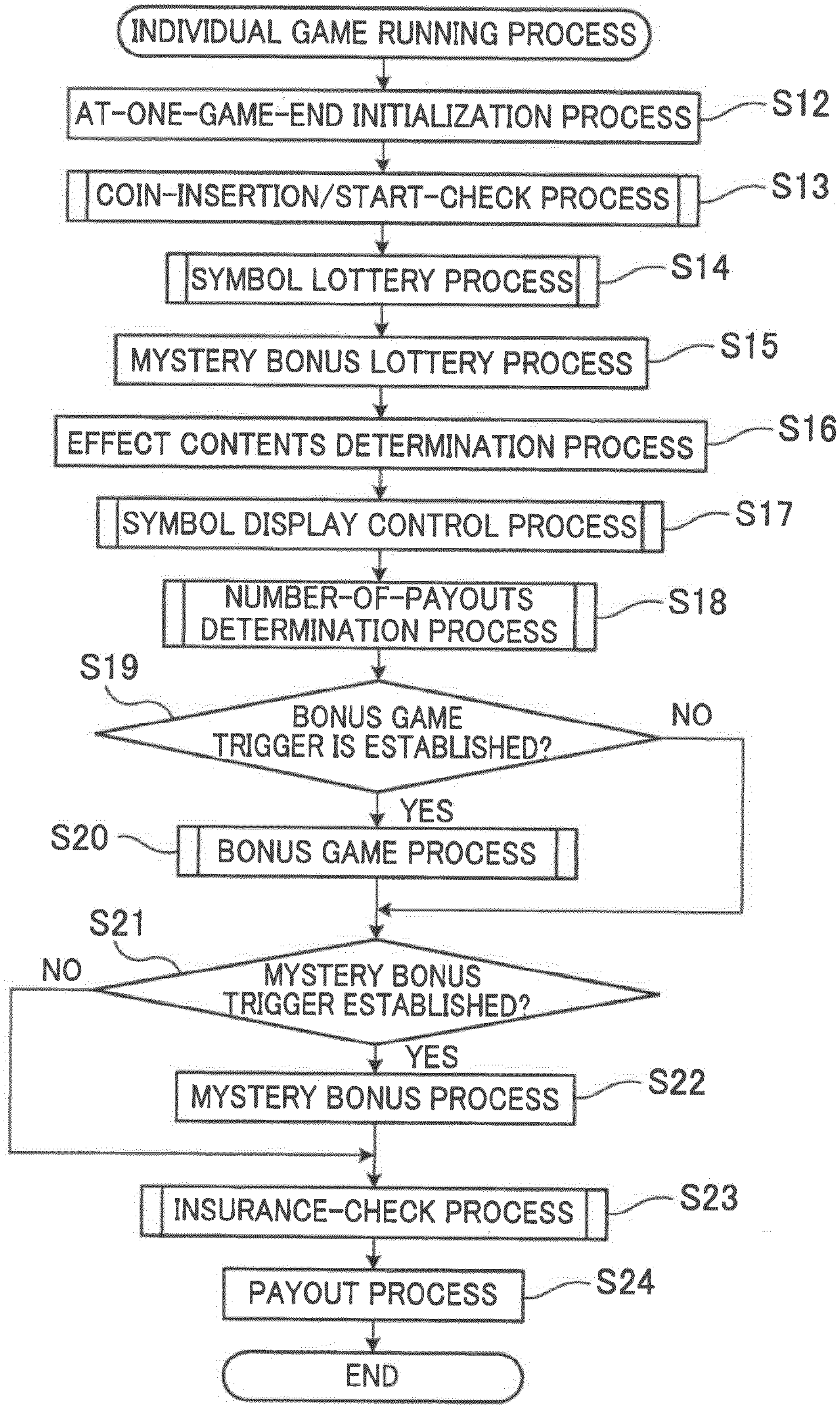
FIG. 17 is a flowchart showing an individual game running process routine performed in the gaming terminal.

Next, with reference to FIG. 17, the following describes the individual game running process.

First, the main CPU 71 performs an at-one-game-end initialization process (step S12). For example, data that becomes unnecessary after each game in the working areas of the RAM 73, such as the number of BETs and the symbols determined by lottery, is cleared.

Next, the main CPU 71 performs a coin-insertion/start-check process which is described later with reference to FIG. 18 (step S13). In the process, input from the BET switch and the spin switch is checked.

Next, the main CPU 71 performs a symbol lottery process which is described later with reference to FIG. 21 (step S14). In the process, to-be stopped symbols are determined based on the random numbers for symbol determination.

Next, the main CPU 71 performs a mystery bonus lottery process (step S15). In the process, lottery determining whether or not to establish a mystery bonus trigger is held. For example, the main CPU 71 extracts a random number for mystery bonus from the numbers in a range of "0 to 99", and establishes the mystery bonus trigger when the extracted random number is "0".

The main CPU 71 performs an effect contents determination process (step S16). The main CPU 71 extracts a random number for effect, and determines any of the effect contents from the preset plurality of effect contents by lottery.

The main CPU 71 then performs a symbol display control process which is described later with reference to FIG. 22 (step S17). In the process, scrolling of the symbol column of each video reel 3 is started, and the to-be stopped symbol determined in the symbol lottery process of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 performs a number-of-payouts determination process which is described later with reference to FIG. 23 (step S18). In the process, the number of payouts is determined based on the combination of symbols displayed along the winning line L, and is stored into a number-of-payouts storage area provided in the RAM 73.

The main CPU 71 then determines whether or not the bonus game trigger has been established (step S19). When the main CPU 71 determines that the bonus game trigger has been established (step S19: YES), the main CPU 71 performs a bonus game process which is described later with reference to FIG. 25 (step S20).

After the process of step S20 or when determining in step S19 that the bonus game trigger has not been established (step S19: NO), the main CPU 71 determines whether or not the mystery bonus trigger is established (step S21). When determining that the mystery bonus trigger has been established (step S21: YES), the main CPU 71 performs the mystery bonus process (step S22). In the process, the number of payouts (e.g. 300) being set for the mystery bonus is stored into the number-of-payouts storage area provided in the RAM 73.

After the process of step S22 or when determining in step S21 that the mystery bonus trigger has not been established (step S21: NO), the main CPU 71 performs an insurance-check process which is described later with reference to FIG. 24 (step S23). In the process, whether or not to perform payout by the insurance is checked.

The main CPU 71 performs a payout process (step S24). The main CPU 71 adds the value stored in the number-of-payouts storage area to a value stored in a number-of-credits storage area provided in the RAM 73. It is to be noted that operations of the hopper 113 may be controlled based on input from the CASHOUT switch 33S, and coins of the number corresponding to the value stored in the number-of-payouts storage area may be discharged from the coin payout exit 15A. Further, operations of the ticket printer 171 may be controlled and a ticket with a barcode may be issued on which a value stored in the number-of-payouts storage area is recorded. The individual game running process ends after this process.

<Coin-Insertion/Start-Check Process>

Figure 18:
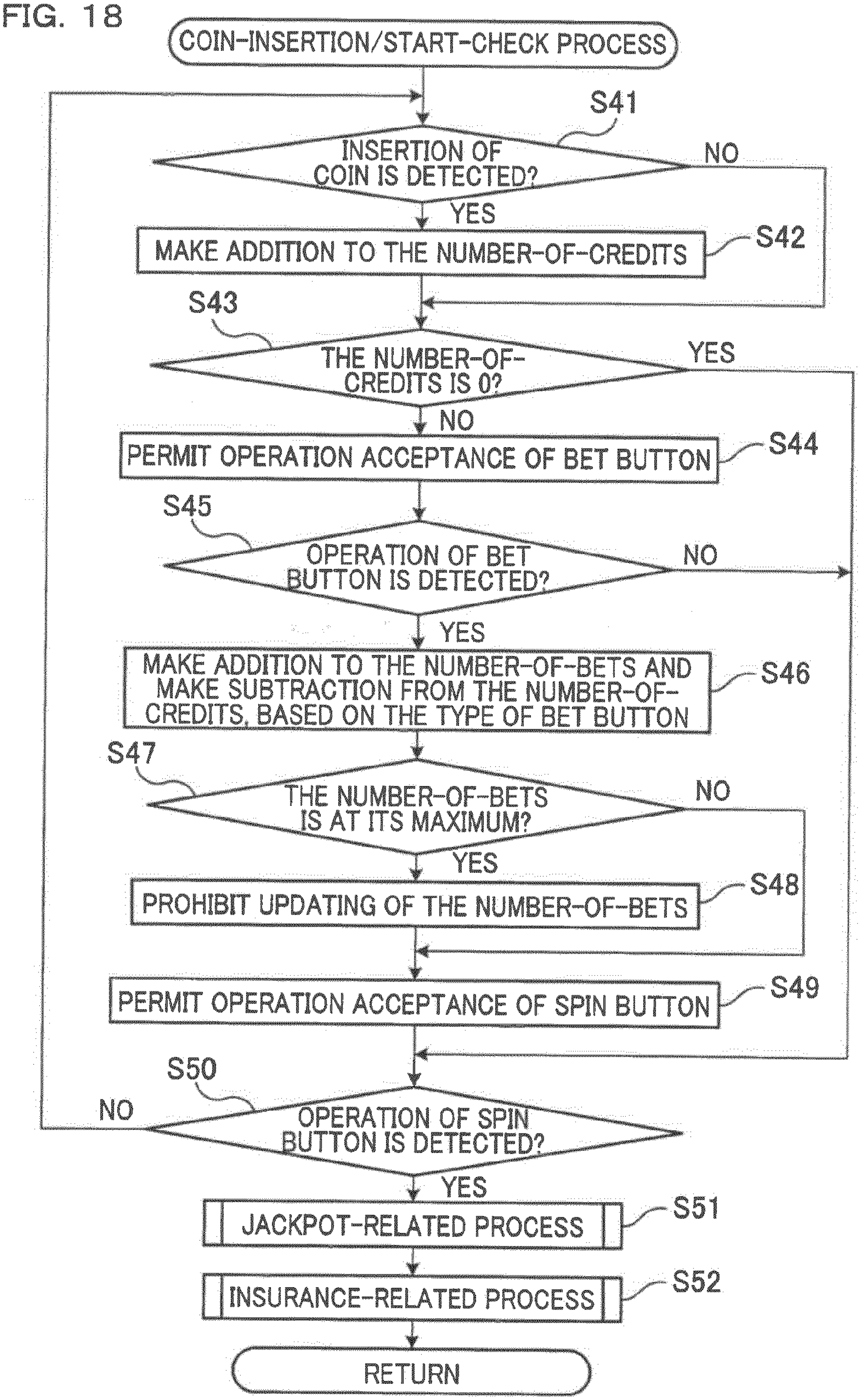
FIG. 18 is a flowchart showing a coin-insertion/start-check process routine performed in the gaming terminal.

Next, with reference to FIG. 18, a coin-insertion/start-check process is described. FIG. 18 is a view showing a flowchart of the coin-insertion/start-check process for the slot machine according to the embodiment of the present invention.

First, the main CPU 71 determines whether or not insertion of a coin has been detected by the coin counter 92C (step S41). When determining that the insertion of a coin has been detected (step S41: YES), the main CPU 71 makes an addition to the value stored in the number-of-credits storage area (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the number-of-credits storage area.

After step S42 or when determining in step S41 that the insertion of a coin has not been detected (step S41: NO), the main CPU 71 determines whether or not the value stored in the number-of-credits storage area is zero (step S43). When the main CPU 71 determines that the value stored in the number-of-credits storage area is not zero (step S43: NO), the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a value stored in a number-of-BETs storage area provided in the RAM 73 and makes a subtraction from the value stored in the number-of-credits storage area, based on the type of the BET button (step S46).

The main CPU 71 then determines whether or not the value stored in the number-of-BETs storage area is at its maximum (step S47). When the main CPU 71 determines that the value stored in the number-of-BETs storage area is at its maximum (step S47: YES), the main CPU 71 prohibits updating of the value stored in the number-of-BETs storage area (step S48).

After step S48 or when determining in step S47 that the value stored in the number-of-BETs storage area is not at its maximum (step 47: NO), the main CPU 71 permits operation acceptance of the spin button (step S49).

After step S49 or when determining in step S45 that the operation of any of the BET buttons has not been detected (step S45: NO), or when determining in step S43 that the value stored in the number-of-credits storage area is zero (step S43: YES), the main CPU 71 determines whether or not operation of the spin button has been detected (step S50). When the main CPU 71 determines that the operation of the spin button has not been detected (step S50: NO), the process is shifted to step S41.

When the main CPU 71 determines that the operation of the spin button has been detected (step S50: YES), the main CPU 71 performs a jackpot-related process which is described later with reference to FIG. 19 (step S51). In this process, the trigger value is calculated and is transmitted to the external controller 200.

Next, the main CPU 71 performs an insurance-related process which is described later with reference to FIG. 20 (step S52). In the process, counting of the number of games is performed which triggers a payout by the insurance. After the process has been performed, the coin-insertion/start-check process is completed.

<Jackpot-Related Process>

Figure 19:
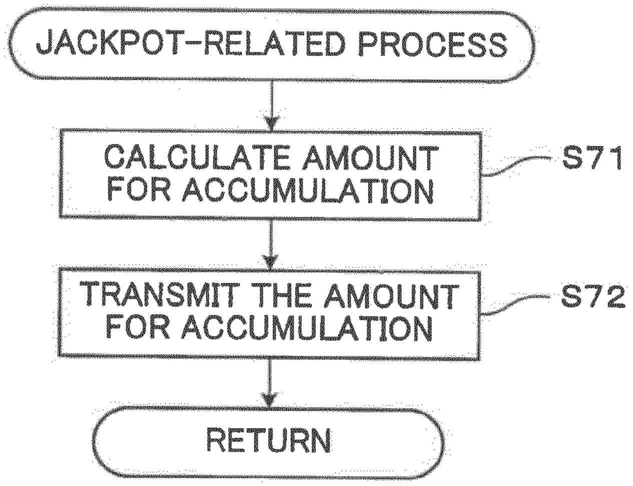
FIG. 19 is a flowchart showing a jackpot-related process routine performed in the gaming terminal.

Now, with reference to FIG. 19, the jackpot-related process is described. FIG. 19 is a view showing a flowchart of the jackpot-related process for the gaming machine according to the embodiment of the present invention.

First, the main CPU 71 calculates the trigger value (step S71). The main CPU 71 obtains the product of the value stored in the number-of-BETs storage area and a preset accumulation ratio, to calculate the trigger value. In the present embodiment, the trigger value is calculated based on the number of BETs; however, the trigger value is not limited to this.

Next, the main CPU 71 transmits the calculated trigger value to the external controller 200 (step S72).

<Insurance-Related Process>

Figure 20:
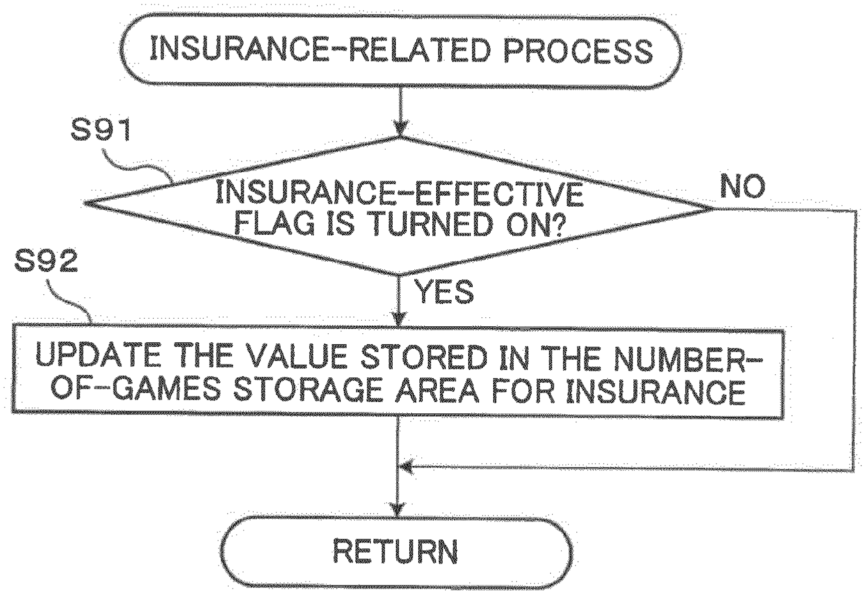
FIG. 20 is a flowchart showing a insurance-related process routine performed in the gaming terminal.

Next, with reference to FIG. 20, the insurance-related process is described. FIG. 20 is shows a flowchart of the insurance-related process for the slot machine according to the embodiment of the present invention.

First, the main CPU 71 determines whether or not an insurance-effective flag is turned on (step S91). The insurance-effective flag is turned on when a command to make the insurance effective is inputted by the player in the insurance selection process which is described later with reference to FIG. 26.

When the main CPU 71 determines that the insurance-effective flag is not turned on (step S91: NO), the main CPU 71 completes the insurance-related process. On the other hand, when the main CPU 71 determines that the insurance-effective flag is turned on (step S91: YES), the main CPU 71 updates a value stored in a number-of-games storage area for insurance provided in the RAM 73 (step S92). The number-of-games storage area for insurance is an area for storing the number of games up to the time of the payout by the insurance. In the process of step S92, the main CPU 71 adds one to the value stored in the number-of-games storage area for insurance. After the process has been performed, the insurance-related process is completed.

<Symbol Lottery Process>

Figure 21:
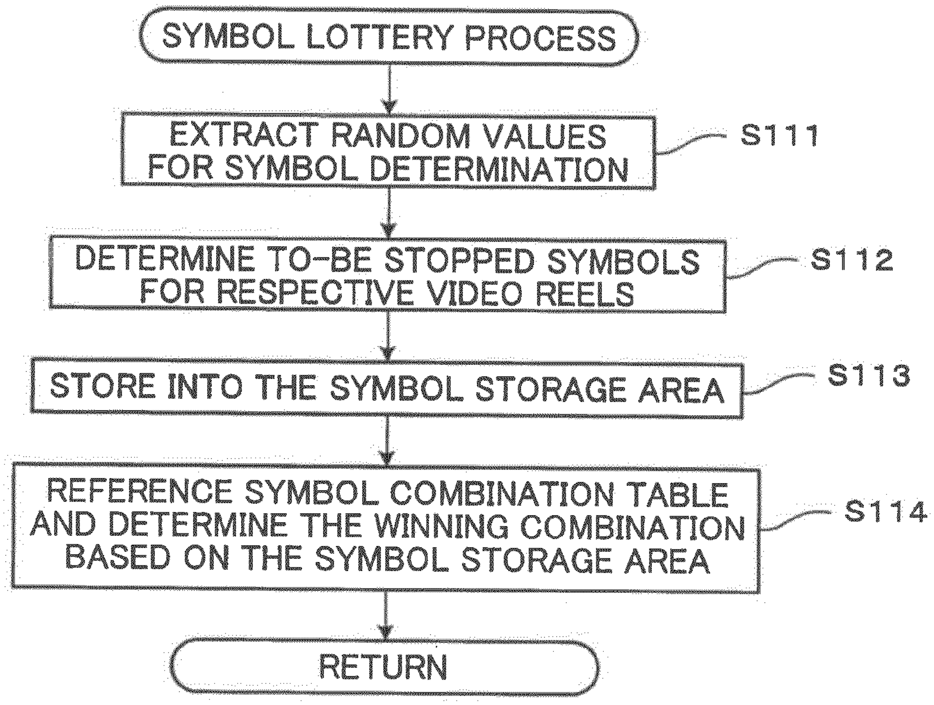
FIG. 21 is a flowchart showing a symbol lottery process routine performed in the gaming terminal.

Next, with reference to FIG. 21, the symbol lottery process is described. FIG. 21 shows a flowchart of the symbol lottery process for the slot machine according to the embodiment of the present invention.

First, the main CPU 71 extracts random numbers for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 refers to the symbol combination table (FIG. 11) for the individual game in cases of the individual game, and refers to the symbol combination table (FIG. 14) for the common game in cases of the common game, to determine a winning combination based on the symbol storage area (step S114). The main CPU 71 determines whether or not the combination of symbols to be displayed along the winning line L by the respective video reels 3 matches any of the combinations of symbols specified by the symbol combination table for the individual game or the symbol combination table for the common game, and determines the winning combination. After the process has been performed, the symbol lottery process is completed.

<Symbol Display Control Process>

Figure 22:
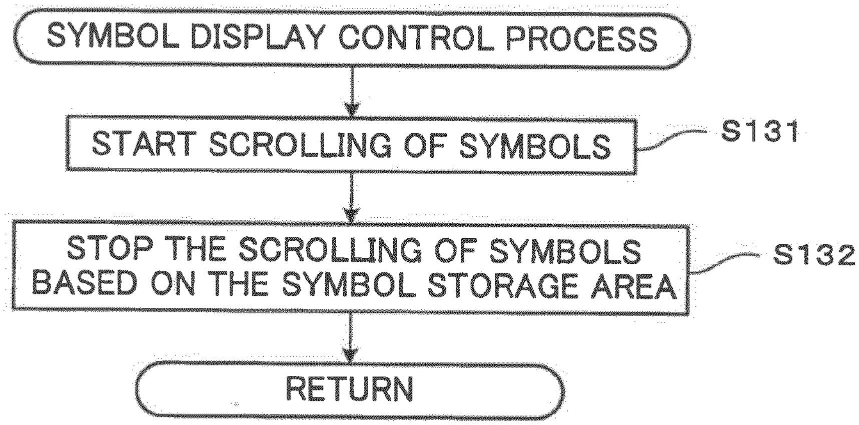
FIG. 22 is a flowchart showing a symbol display control process routine performed in the gaming terminal.

Next, with reference to FIG. 22, the symbol display control process is described. FIG. 22 shows a flowchart of the symbol display control process for the slot machine according to the embodiment of the present invention.

First, the main CPU 71 starts scrolling of the symbol columns of the respective video reels 3 that are displayed to the symbol display region 4 of the lower image display panel 141 (step S131). The main CPU 71 then stops the scrolling of the symbol columns of the respective video reels 3, based on the aforementioned symbol storage area (step S132). After the process has been performed, the symbol display control process is completed.

<Number-of-Payouts Determination Process>

Figure 23:
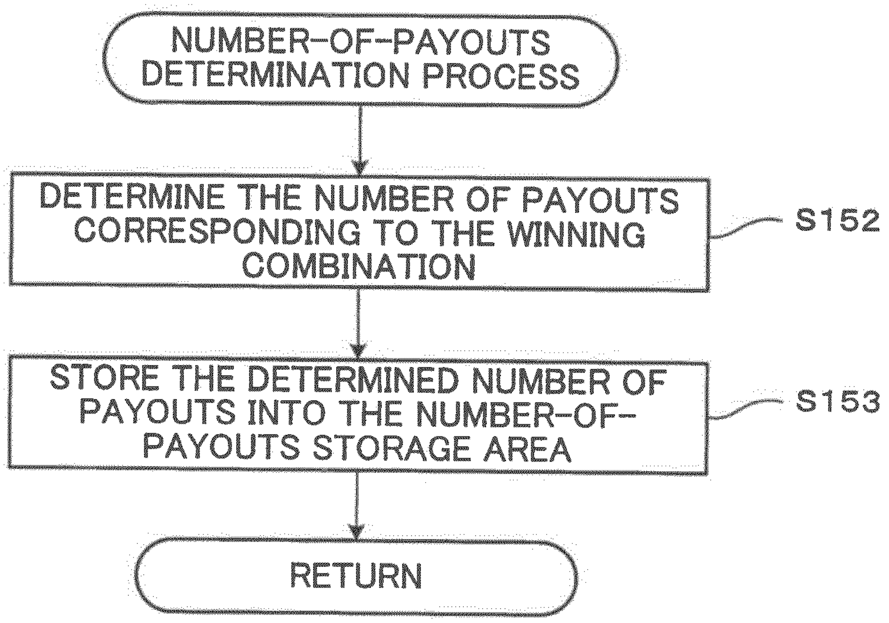
FIG. 23 is a flowchart showing a number-of-payouts determination process routine performed in the gaming terminal.

Next, with reference to FIG. 23, the number-of-payouts determination process is described. FIG. 23 shows a flowchart of the number-of-payouts determination process for the slot machine according to the embodiment of the present invention.

First, the main CPU 71 determines the number of payouts corresponding to the winning combination (step S152). For example, when the winning combination is "BELL" in the individual game, the main CPU 71 determines "8" as the number of payouts (see FIG. 11). It is to be noted that the main CPU 71 determines "0" as the number of payouts in the case where the game is lost. Next, the main CPU 71 stores the determined number of payouts into the number-of-payouts storage area (step S153). After the process has been performed, the number-of-payouts determination process is completed.

<Insurance-Check Process>

Figure 24:
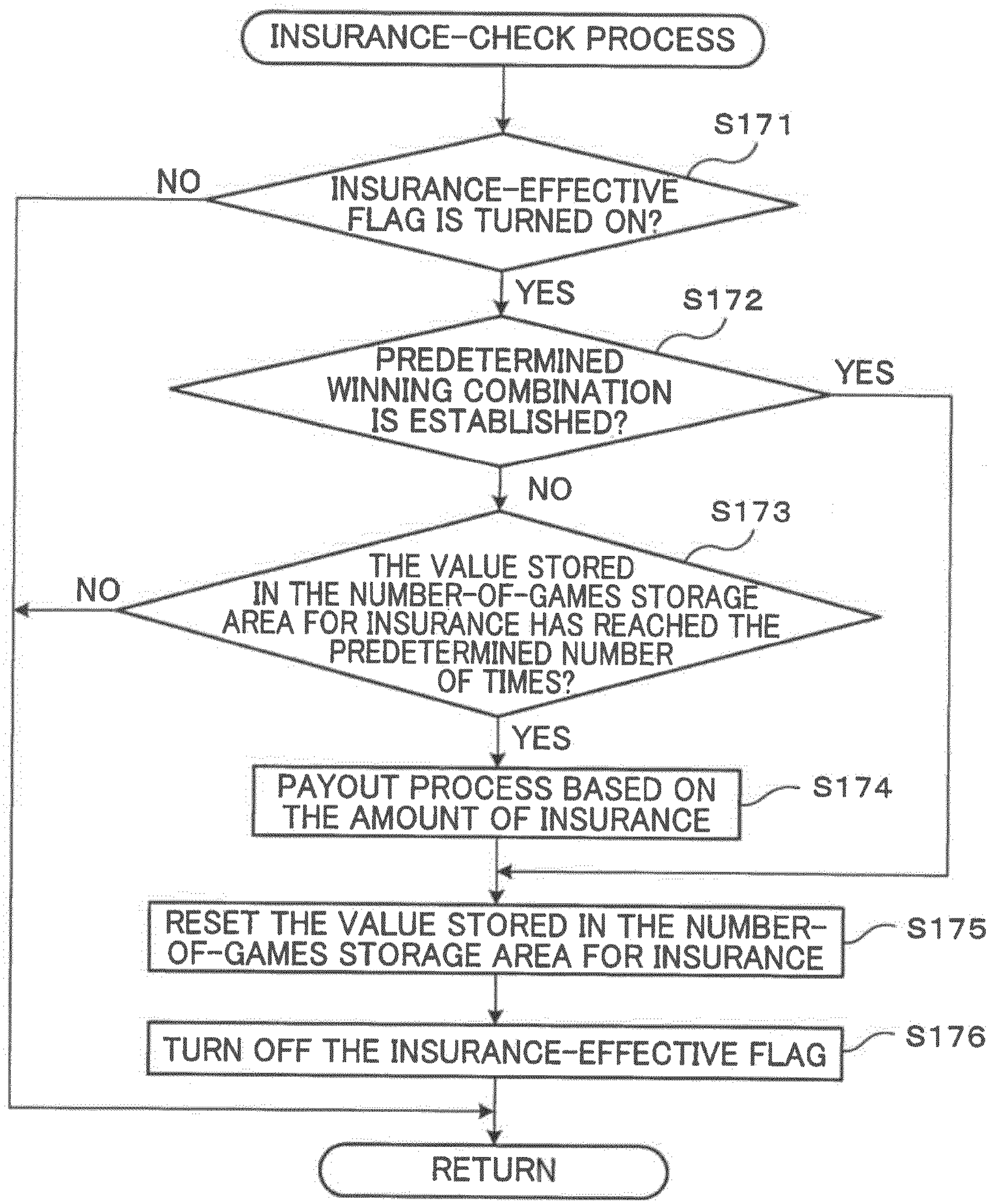
FIG. 24 is a flowchart showing a insurance-check process routine performed in the gaming terminal.

Next, with reference to FIG. 24, the insurance-check process is described. FIG. 24 shows a flowchart of the insurance-check process for the slot machine according to the embodiment of the present invention.

First, the main CPU 71 determines whether or not the insurance-effective flag is turned on (step S171). When the main CPU 71 determines that the insurance-effective flag is not turned on (step S171: NO), the main CPU 71 completes the insurance-check process.

When the main CPU 71 determines that the insurance-effective flag is turned on (step S171: YES), the main CPU determines whether or not a predetermined winning combination has been established (step S172). In the present embodiment, "bonus game trigger", and "mystery bonus" are subjects of the predetermined winning combination.

When the main CPU 71 determines that the predetermined winning combination has not been established (step S172: NO), the main CPU 71 determines whether or not the value stored in the number-of-games storage area for insurance has reached a predetermined number of times (e.g. 300) (step S173). When the main CPU 71 determines that the value stored in the number-of-games storage area for insurance has not reached the predetermined number of times (step S173: NO), the main CPU 71 completes the insurance-check process.

When the main CPU 71 determines that the value stored in the number-of-games storage area for insurance has reached the predetermined number of times (step S173: YES), the main CPU 71 performs a payout process based on the amount of insurance (step S174). The main CPU 71 adds an amount (e.g. 200) previously set as the amount of insurance to the value stored in the number-of-credits storage area.

After step S174 or when determining in step S172 that the predetermined winning combination has been established (step S172: NO), the main CPU 71 resets the value stored in the number-of-games storage area for insurance (step S175). Next, the main CPU 71 turns the insurance-effective flag off (step S176). After the process has been performed, the insurance-check process is completed.

<Bonus Game Process>

Figure 25:
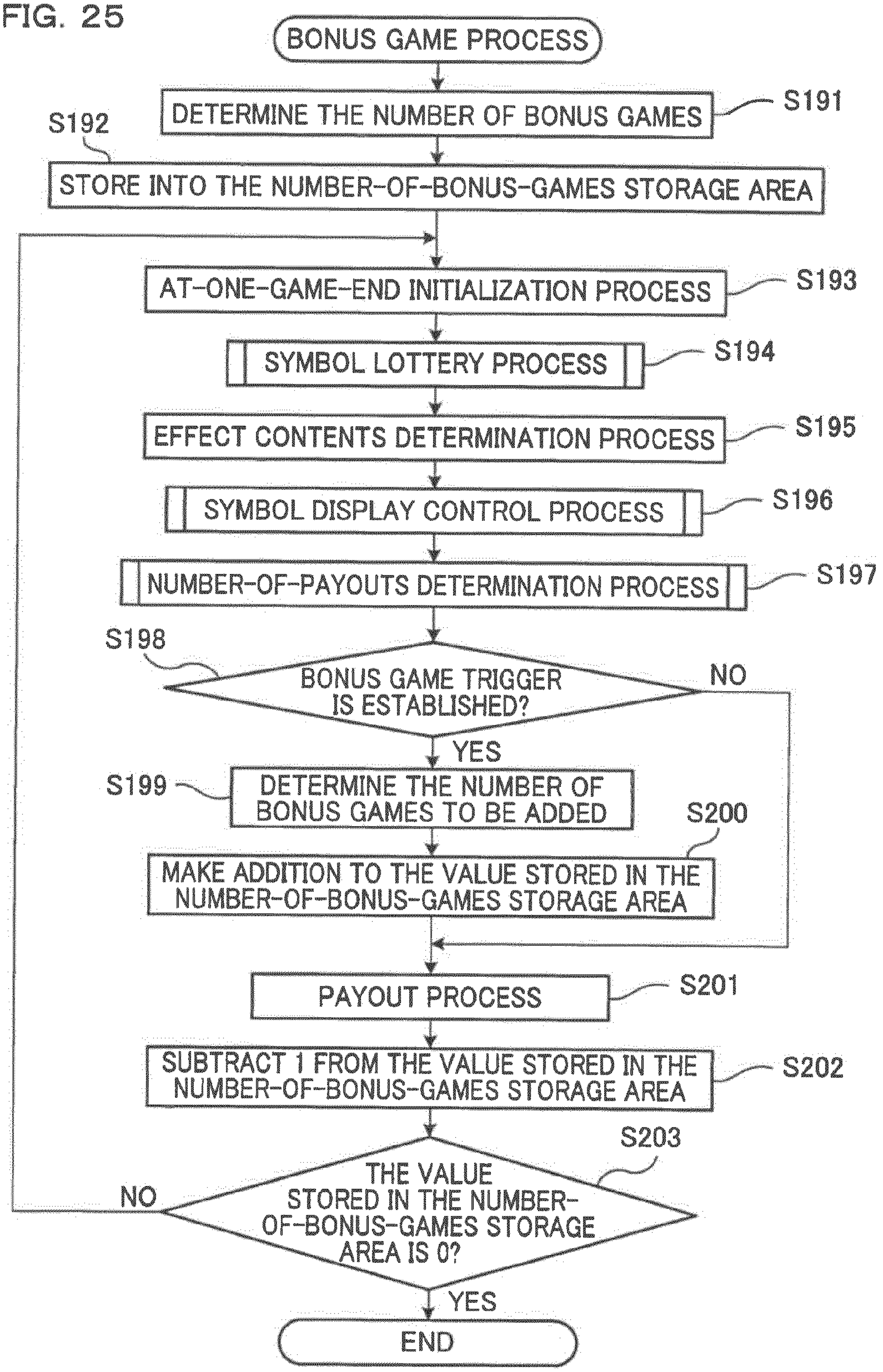
FIG. 25 is a flowchart showing a bonus game process routine performed in the gaming terminal.

Next, with reference to FIG. 25, the bonus game process is described. FIG. 25 shows a flowchart of the bonus game process for the slot machine according to the embodiment of the present invention.

The main CPU 71 first determines the number of bonus games (step S191). The main CPU 71 extracts a random number for number-of-bonus-games determination, and determines any one of the various numbers of bonus games such as "50", "70" and "100" by lottery.

Next, the main CPU 71 stores the determined number of bonus games into a number-of-bonus-games storage area provided in the RAM 73 (step S192).

The main CPU 71 then performs an at-one-game-end initialization process in the same way as the process of step S12 described with reference to FIG. 17 (step S193). The main CPU 71 then performs the symbol lottery process described with reference to FIG. 21 (step S194). Then, the main CPU 71 performs the effect contents determination process in the same way as the process of step S16 described with reference to FIG. 17 (step S195). Next, the main CPU 71 performs the symbol display control process described with reference to FIG. 22 (step S196). The main CPU 71 then performs the number-of-payouts determination process described with reference to FIG. 23 (step S197).

Next, the main CPU 71 determines whether or not the bonus game trigger has been established (step S198). When the main CPU 71 determines that the bonus game trigger has been established (step S198: YES), the main CPU 71 determines the number of bonus games to be added (step S199). In the same way as the aforementioned process of step S191, the main CPU 71 determines the number of bonus games. The main CPU 71 then adds the determined number of bonus games to the value stored in the number-of-bonus-games storage area (step S200).

After the process of step S200 or when determining in step S198 that the bonus game trigger has not been established (step S198: NO), the main CPU 71 performs the payout process (step S201). In the payout process, the main CPU 71 adds the value stored into the number-of-payouts storage area in the aforementioned number-of-payouts determination process of step S197 to a value stored in a number-of-payouts storage area for bonus. The number-of-payouts storage area for bonus is an area for storing a total of the numbers of payouts determined during the bonus games. When the bonus game process has been completed, the main CPU 71 adds the value stored in the number-of-payouts storage area for bonus to the value stored in the number-of-credits storage area provided in the RAM 73, in the payout process of step S24 described with reference to FIG. 17. That is, the total of the numbers of payouts determined during the bonus games is collectively paid out. It is to be noted that coins may be discharged from the coin payout exit 15A, or a ticket with a barcode may be issued.

Next, the main CPU 71 subtracts one from the value stored in the number-of-bonus-games storage area (step S202). Next, the main CPU 71 determines whether or not the value stored in the number-of-bonus-games storage area is zero (step S203). When the main CPU 71 determines that the value stored in the number-of-bonus-games storage area is not zero (step S203: NO), the main CPU 71 shifts the process to step S193. On the other hand, when the main CPU 71 determines that the value stored in the number-of-bonus-games storage area is zero (step S203: YES), the main CPU 71 completes the bonus game process. When the bonus game process has been completed, the process is shifted to the process of step S21 described with reference to FIG. 17.

<Insurance Selection Process>

Figure 26:
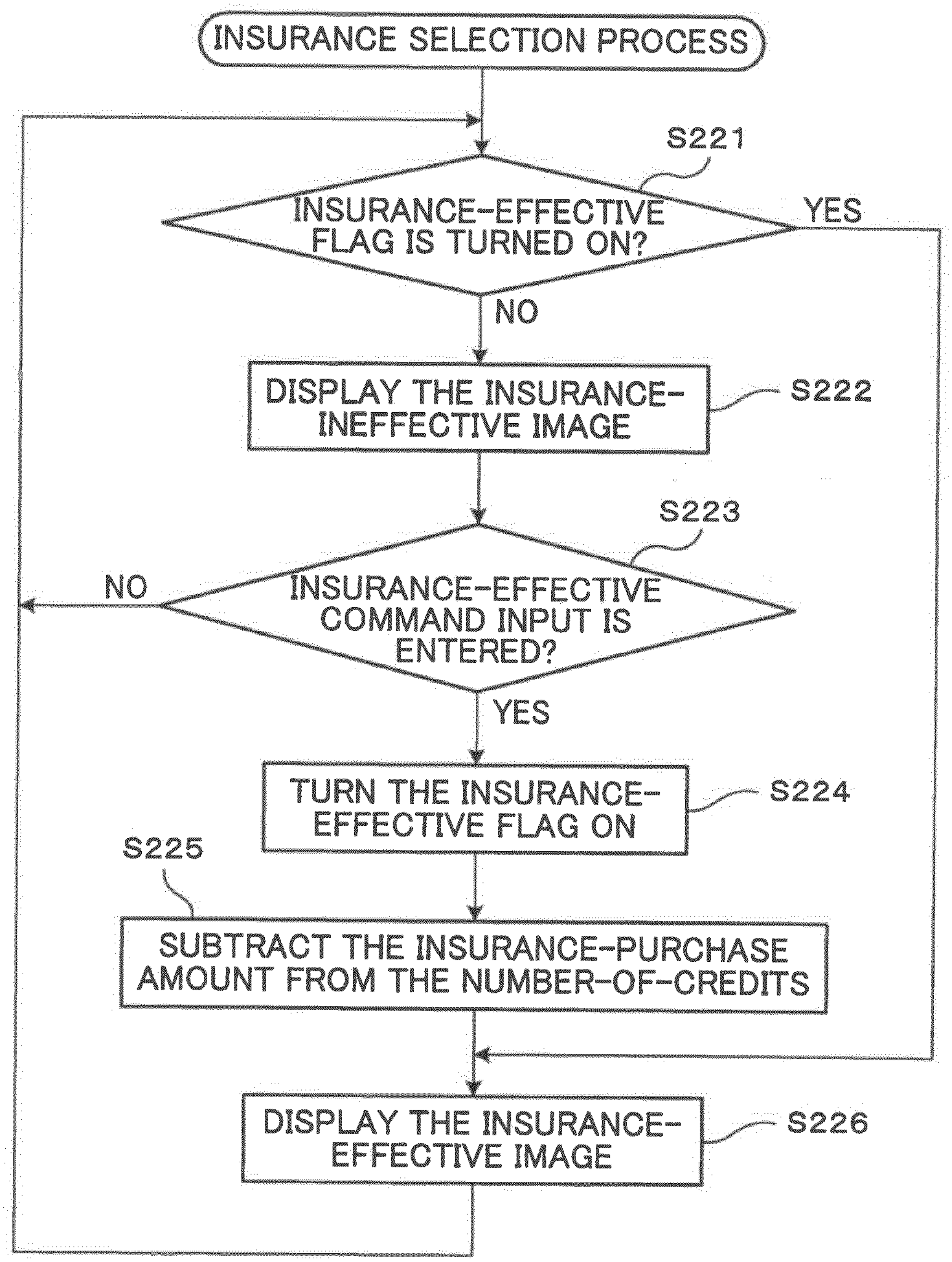
FIG. 26 is a flowchart showing a insurance selection process routine performed in the gaming terminal.

Next, with reference to FIG. 26, the insurance selection process is described. FIG. 26 shows a flowchart of the insurance selection process for the gaming machine according to the embodiment of the present invention.

First, the main CPU 71 determines whether or not the insurance-effective flag is turned on (step S221). When the main CPU 71 determines that the insurance-effective flag is not turned on (step S221: NO), the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141. As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered (step S223: NO), the main CPU 71 shifts the process to step S221 with the insurance-effective flag turned off. On the other hand, when the main CPU 71 determines that the insurance-effective command input has been entered (step S223: YES), the main CPU 71 turns the insurance-effective flag on (step S224).

Next, the main CPU 71 subtracts the insurance-purchase amount from the value stored in the number-of-credits storage area (step S225). In the present embodiment, an amount corresponding to, for example, one dollar is subtracted from the value stored in the number-of-credits storage area. After step S225 or when determining in step S221 that the insurance-effective flag is turned on (step S221: YES), the main CPU 71 displays the insurance-effective image (step S226). As the insurance-effective image, for example, an image showing "INSURANCE CONTINUED WIN 200 CREDIT" is displayed. This image is an image informing the player that the insurance is effective, and that the value of "200" is to be added to the value stored in the number-of-credits storage area when the insurance condition is satisfied. After the process has been performed, the process is shifted to step S221.

<Common Game Running Process>

Figure 27:
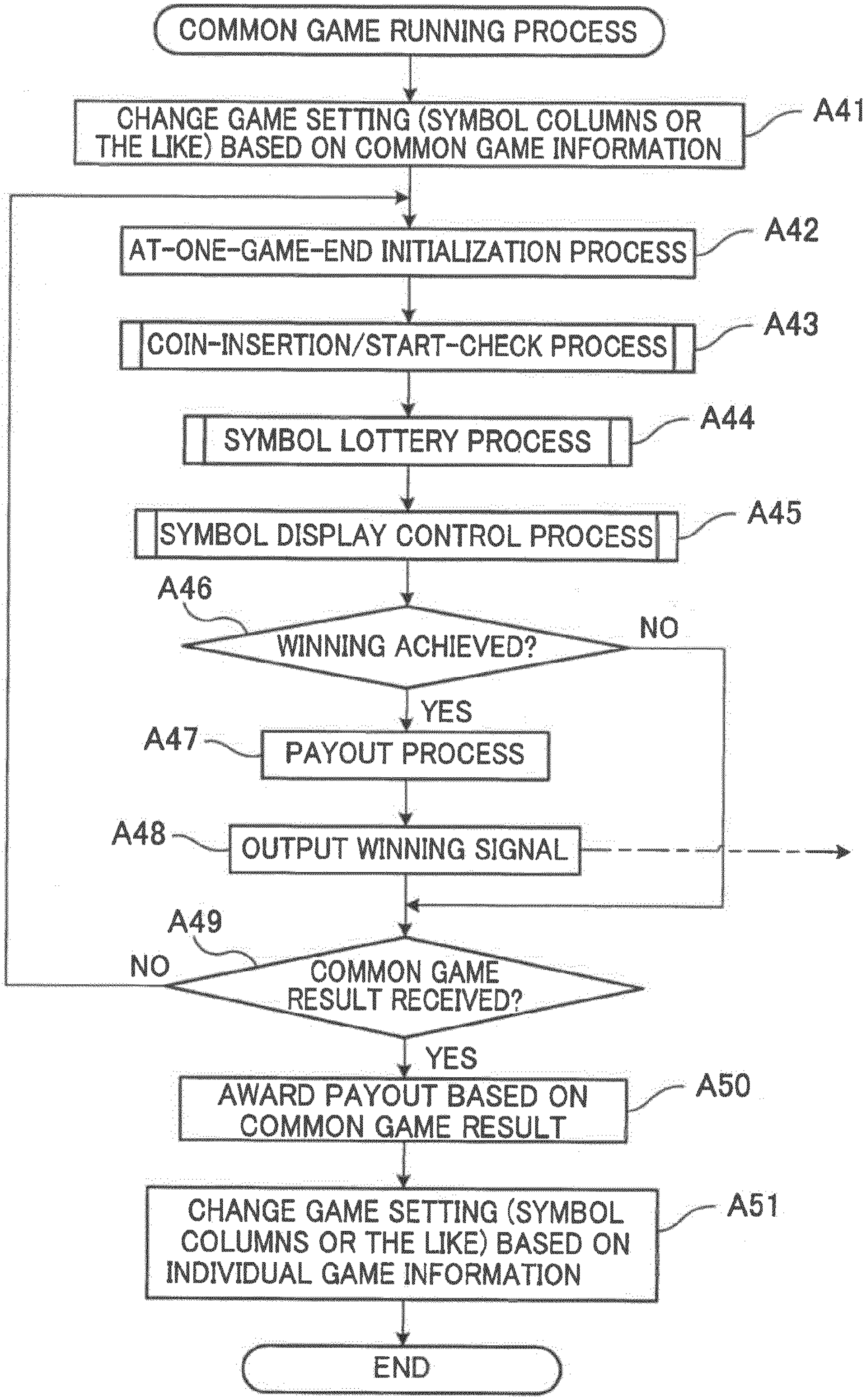
FIG. 27 is a flowchart showing a common game running process routine performed in the gaming terminal.

Next, the following describes the common game running process with reference to FIG. 27. FIG. 27 shows a flowchart of the common game running process performed in the slot machine, according to the embodiment of the present invention.

First, the main CPU 71 changes the game setting of the slot machine 10 to a game setting for a common game, based on the common game program and the common game information stored in the RAM 73 (step A41). For example, the symbol columns are changed from the symbol columns for the individual game (see FIG. 10) to the symbol columns for the common game (see FIG. 13). Further, for example, the symbol combination table is changed from the individual game symbol combination table (see FIG. 11) to the common game symbol combination table (see FIG. 14).

Next, the main CPU 71 performs the at-one-game-end initialization process (step A42) as is the case of the step S12 described with reference to FIG. 17, and performs the coin-insertion/start-check process described with reference to FIG. 18 (step A43). The main CPU 71 then performs the symbol lottery process described with reference to FIG. 21 (step A44).

Next, the main CPU 71 performs the symbol display control process described with reference to FIG. 22 (step A45). Next, the main CPU 71 determines whether or not the symbols 180 rearranged on the winning line L achieves a winning combination (step A46). When the main CPU 71 determines that the winning combination is not achieved (step A46: NO), the process goes to step A49.

On the other hand, when the main CPU 71 determines that a winning combination is achieved (step A46: YES), the main CPU 71 performs a payout process based on the winning combination (step A47), and transmits to the external controller 200 a winning signal indicating the number of light emitting portions 403 whose respective states are to be changed (step A48). The process then goes to step A49.

In step A49, the main CPU 71 determines whether or not the game result information of the common game is received from the external controller 200. If the main CPU 71 determines that no game result information is received (step A49: NO), the process returns to step A42.

On the other hand, when the main CPU 71 determines that the game result information is received (step A49:YES), the main CPU 71 awards a payout based on the game result information (step A50). Next, the main CPU 71 changes the game setting to the individual game setting based on the individual game information stored in the RAM 73 (step A51), and ends this process routine.

<Center-Side Process>

Next, the following describes a center-side process with reference to FIG. 28. FIG. 28 shows a flowchart of the center-side process of the external controller in the gaming machine according to the embodiment of the present invention.

First, the main CPU 241 determines whether or not a game information requesting command is received from any of the slot machines 10 (step B11). When the main CPU 241 determines that the game information requesting command is received (step B11: YES), the main CPU 241 starts the thread of a file transmission process (see FIG. 29) which is run independently of this process routine (step B12). The process then returns to step B11. Note that the file transmission process is a process for transmitting the common game information file to the slot machine 10.

On the other hand, when the main CPU 241 determines that no game information requesting command is received (step B11: NO), the main CPU 241 determines whether or not a trigger value is received from any slot machine 10 (step B13). When the main CPU 241 determines that no trigger value is received (step B13: NO), the process goes to the step B17.

On the other hand, when the main CPU 241 determines that a trigger value is received (step B13: YES), the main CPU 241 adds the trigger value to the total accumulated value or the individual accumulated value stored in the RAM 243 (step B14). Next, the main CPU 241 determines whether or not the total accumulated value or the individual accumulated value stored in the RAM 243 has reached the threshold stored in RAM 243 (step B15). When the main CPU 241 determines that the accumulated value has not reached the threshold (step B15: NO), the process returns to step B11.

On the other hand, when the main CPU 241 determines that the accumulated value has reached the threshold (step B15: YES), the main CPU 241 transmits the common game start signal to the plurality of slot machines 10 (step B16). The process then returns to step B11.

In step B17, the main CPU 241 determines whether or not a winning signal is received. When the main CPU 241 determines that no winning signal is received (step B17: NO), the process goes to step B22.

On the other hand, when the main CPU 241 determines that the winning signal is received (step B17: YES), the main CPU 241 changes, based on the winning signal, the status of the light emitting portions 403 in the path 401 corresponding to the slot machine 10 having transmitted the winning signal, towards the common game payout display unit 400 (step B18). Next, the main CPU 241 determines whether or not the status of the plurality of light emitting portions 403 of any path 401 has changed all the way up to the common game payout display unit 400 so as to determine whether any slot machine 10 has won a payout of the common game (step B19). When the main CPU 241 determines that no slot machine 10 has won the payout of the common game (step B19: NO), the process returns to step B11.

On the other hand, when the main CPU 241 determines that the payout of the common game has been won by a slot machine 10 (step B19: YES), the main CPU 241 performs a payout awarding process for awarding the payout of common game, and outputs the game result information of the common game (step B20). Note that the game result information of the common game transmitted to the slot machine 10 having won the payout includes a payout award signal indicating the payout amount of the common game. Next, the main CPU 241 subtracts a predetermined amount from the total accumulated value or the individual accumulated value, according to the amount of payout awarded in the common game, and stores the resulting value in the RAM 243 (step B21). The process then returns to step B11. Note that, in step B21, the threshold of the total accumulated value or the individual accumulated value stored in the RAM 243 which value serves as the common game starting condition may be variable.

In step B22, the main CPU 241 determines whether or not the resulting signature is received from the slot machine 10. When the main CPU 241 determines that no resulting signature is received (step B22: NO), the process returns to step B11.

On the other hand, when the main CPU 241 determines that the resulting signature is received (step B22: YES), the main CPU 241 compares the signature extracted from the common game information stored in the RAM 243 with the resulting signature, to check if there is any fraud such as tampering of data in the files during the communication between the slot machine 10 and the external controller 200 (step B23). Next, the main CPU 241 transmits, to the slot machine 10 having transmitted the resulting signature, the signature determination result which is the result of determining the presence of any fraud (step B24). The process then returns to step B11.

<File Transmission Process>

Next, the following describes the file transmission process with reference to FIG. 29. FIG. 29 shows a flowchart of the file transmission process of the external controller in the gaming machine according to the embodiment of the present invention.

First, the main CPU 241 determines whether the identification information contained in the game information requesting command received from the slot machine 10 matches with the identification information corresponding to the common game information stored in the RAM 243 (step B31). When the main CPU 241 determines that the two pieces of identification information match with each other (step B31: YES), the main CPU 241 transmits to the slot machine 10 update command information indicating no transmission of common game information is to be performed (step B32).

On the other hand, when the main CPU 241 determines that the two pieces of identification information match with each other (step B31: NO), the main CPU 241 transmits to the slot machine 10 the update command information indicating that transmission of the common game information is to be performed (step B33). Next, the main CPU 241 transmits the file size of the common game information file stored in the memory card 253 to the slot machine 10 (step B34).

Next, the main CPU 241 reads the common game information file stored in the memory card 253 in units of 50 KB, and transmits the file to the slot machine 10 (step B35). Note that in step B35, the main CPU 241 also transmits the identification information corresponding to the common game information to the slot machine 10.

Next, the main CPU 241 determines whether transmission of all the data of the common game information file stored in the memory card 253 to the slot machine 10 is completed (step B36). When the main CPU 241 determines that transmission of all the data is not completed (step B36: NO), the process returns to step B35. On the other hand, when the main CPU 241 determines that transmission of all the data is completed (step B36: YES), the main CPU 241 transmits, to the slot machine 10, a transmission end signal indicating that transmission of all the data of the common game information file is completed (step B37), and the process routine ends thereafter.

As described, the common game information for use in the common game which is run in the plurality of slot machines 10 is received from the external controller 200, when the slot machine 10 is booted. Therefore, changing the common game information managed by the game information management device of the external controller 200 will change the common game information in the slot machines 10 connected to and in communication with the external controller 200. This reduces the work required for changing the common game information for use in the common game. Further, since the common game information is received from the external controller 200 when the slot machine 10 is booted, the slot machine 10 is able to run the common game based on the common game information immediately after reception of a common game starting command from the external controller 200.

Further, as described above, the external controller 200 transmits the common game information to the slot machine 10, only when the common game information stored in the terminal-side game information storage device of the slot machine 10 and the common game information stored in the game information management device of the external controller 200 do not match with each other. This reduces the work for changing the common game information.

One embodiment of the present invention is thus described hereinabove. The present invention however is not limited to the above embodiment. For example, the following embodiment of the present invention is also possible. The following describes a gaming machine of another embodiment of the present invention.

A gaming machine of the other embodiment is adapted so that the common game information is received from the external controller 200 and the content of the common game is changed, when no player plays a game in a slot machine 10 for a predetermined period.

[Terminal-Side Process]

Figure 30:
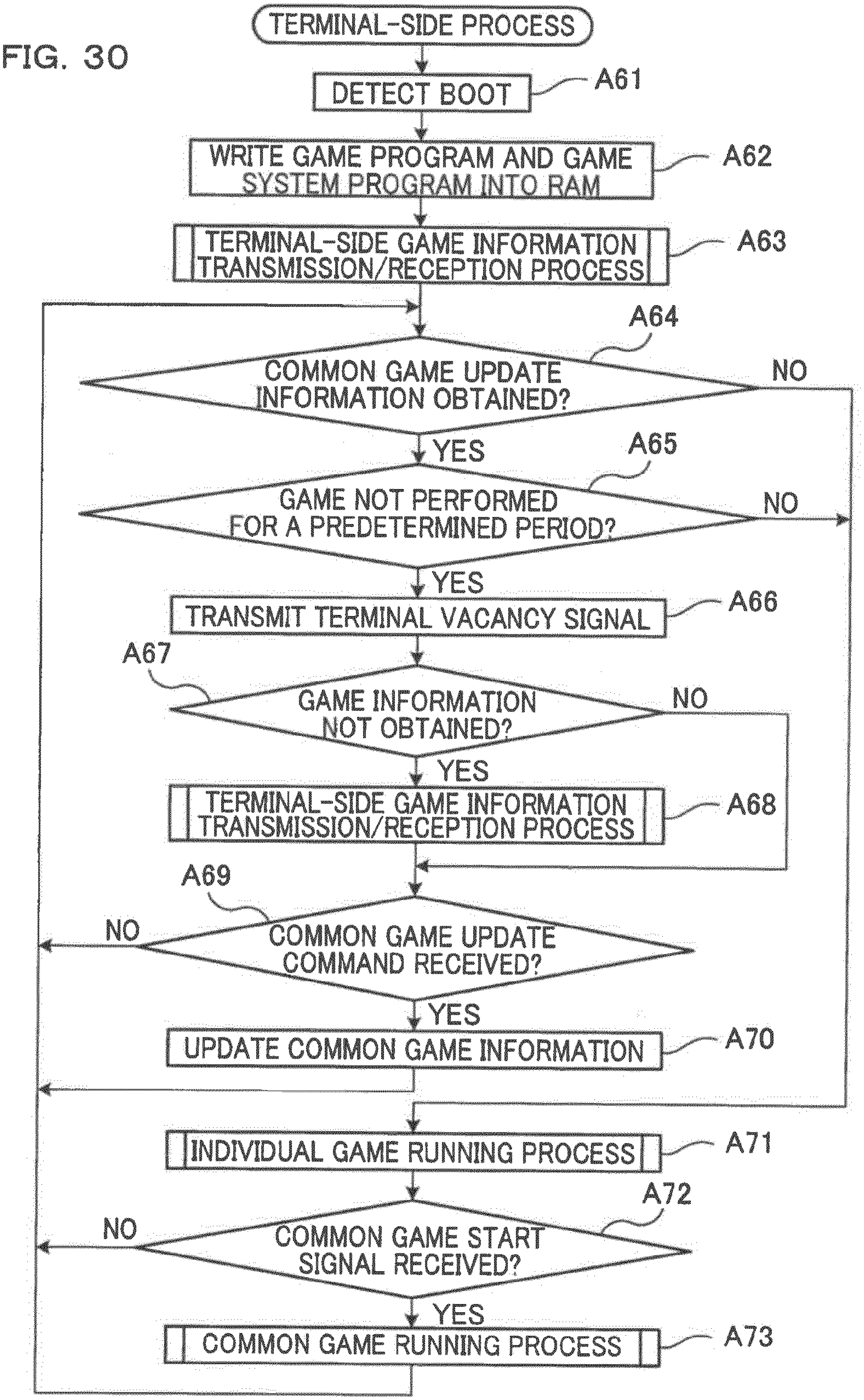
FIG. 30 is a flowchart showing a terminal-side process routine performed in a gaming terminal of another embodiment.

First, the following describes a terminal-side process of the other embodiment, with reference to FIG. 30. FIG. 30 shows a flowchart of a terminal-side process performed in the slot machine of a gaming machine, according to the other embodiment of the present invention.

First, the main CPU 71 detects boot of a slot machine 10 (step A61). Next, the authenticated game system program, a game program (the individual game information), and the common game program are read out from the GPCF 57 and the GSCF 58 via the gaming board 50, and are written into the RAM 73 (step A62).

Next, the main CPU 71 performs a terminal-side game information transmission/reception process described with reference to FIG. 16 (step A63).

Next, the main CPU 71 determines whether or not the common game update information containing the identification information of the common game information subject to the change is received from the external controller 200 (step A64). When the main CPU 71 determines that the common game update information is not received (step A64: NO), the process goes to step A71.

On the other hand, when the main CPU 71 determines that the common game update information is received (step A64: YES), the main CPU 71 determines if no game has been performed in the slot machine 10 for a predetermined period (step A65). When the main CPU 71 determines that a game has been performed by a player before the elapse of the predetermined period (step A65: NO), the process goes to step A71.

On the other hand, when the main CPU 71 determines that no game has been performed for the predetermined period (step A65: YES), the main CPU 71 transmits a terminal-vacancy signal indicating that the no game has been played by a player (step A66). Next, the main CPU 71 determines whether the identification information in the common game update information and the identification information stored in the RAM 73 match with each other, so as to determine whether the common game information has been already updated (obtained) (step A67). When the main CPU 71 determines that the common game information has been updated (step A67:NO), the process goes to step A69.

On the other hand, when the main CPU 71 determines that the common game information has not been updated (step A67: YES), the main CPU 71 performs the terminal-side game information transmission/reception process which is described with reference to FIG. 16 (step A68). The process then goes to step A69. Note that the common game information (hereinafter, first common game information) stored in the RAM 73 before step A68 is stored in the RAM 73 as it is until the later-described step A70. Further, until step A70 is performed, the common game information (hereinafter, second common game information) received from the external controller 200 in the step A68 is not used, and the common game is performed using the first common game information.

In step A69, the main CPU 71 determines whether or not a common game update command is received from the external controller 200. When the main CPU 71 determines that no common game update command has been received (step A69: NO), the process returns to step A64.

On the other hand, when the main CPU 71 determines that the common game update command has been received (step A69: YES), the main CPU 71 changes the game setting so that the common game is run by using the second common game information after the step A69 (step A70). The process then returns to step A64.

In step A71, the main CPU 71 performs the individual game running process described with reference to FIG. 17. Next, the main CPU 71 determines whether or not a common game starting command is received from the external controller 200 (step A72). If the main CPU 71 determines that no common game starting command is received (step A72: NO), the process returns to step A64. On the other hand, when the main CPU 71 determines that the common game starting command is received (step A72: YES), the main CPU 71 performs a common game running process described later with reference to FIG. 27 (step A73). The process then returns to step A64.

[Center-Side Process]

Figure 31:
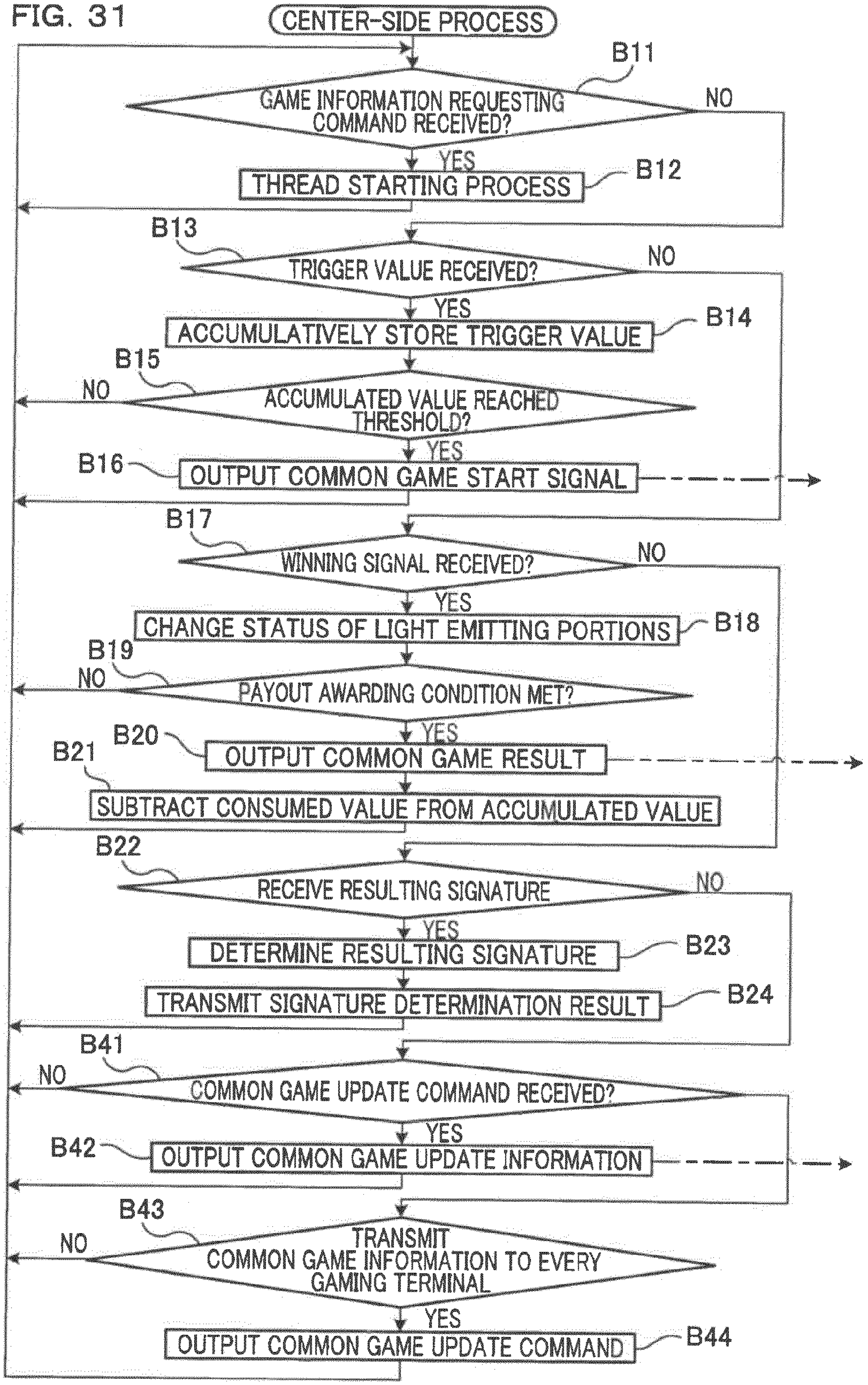
FIG. 31 is a flowchart showing a center-side process routine performed in an external controller of another embodiment.

First, the following describes a center-side process of the other embodiment with reference to FIG. 31. FIG. 31 shows a flowchart of the center-side process performed in the external controller of the gaming machine according to the embodiment of the present invention.

Step B11 to step B24 are the same as those of the center-side process described with reference to FIG. 28, and no further explanation is provided for these steps.

In step B22, when the main CPU 241 determines that no resulting signature is received (step B22: NO), the main CPU 241 determines whether or not a common game update command is received (step B41). The common game update command is a command that occurs, for example, when the memory card 253 inserted into the card slot 253S is changed, or use of different common game information in the memory card 253 for the common game is instructed by an operation from the outside.

When the main CPU 241 determines that the common game update command is received (step B41: YES), the main CPU 241 transmits the common game update information to the slot machine 10 (step B42). The process then returns to step B11.

On the other hand, when the main CPU 241 determines that no common game update command has been received (step B42: NO), the main CPU 241 determines whether transmission of the common game information is completed in relation to all of the slot machines 10 connected to and in communication with the external controller 200 (step B43). It is possible to add to the condition in this process the reception of terminal vacancy signal from all the slot machines 10 connected to and in communication with the external controller 200. In other words, the main CPU 241 may determine whether transmission of the common game information is completed in relation to all the slot machines 10 connected to and in communication with the external controller 200, and whether a terminal vacancy signal is received from all the slot machines 10.

When the main CPU 241 determines that transmission of the common game information to all the slot machine 10 is not completed (step B43: NO), the process returns to step B11.

On the other hand, when the main CPU 241 determines that the transmission of the common game information to all the slot machines 10 has been completed, the main CPU 241 transmits the common game update command to the slot machines 10 (step B44). The process then returns to step B11.

As described above, in the other embodiment, the common game information is received from the external controller 200 and the content of the common game is changed when no game has been played by the player. The timing for transmitting the common game information is differentiated among the plurality of slot machines 10 connected to and in communication with the external controller 200. This prevents the plurality of slot machines 10 from accessing the external controller 200 all at once, and shortens the period for transmitting the common game information to each slot machine 10.

Example

Figure 32:
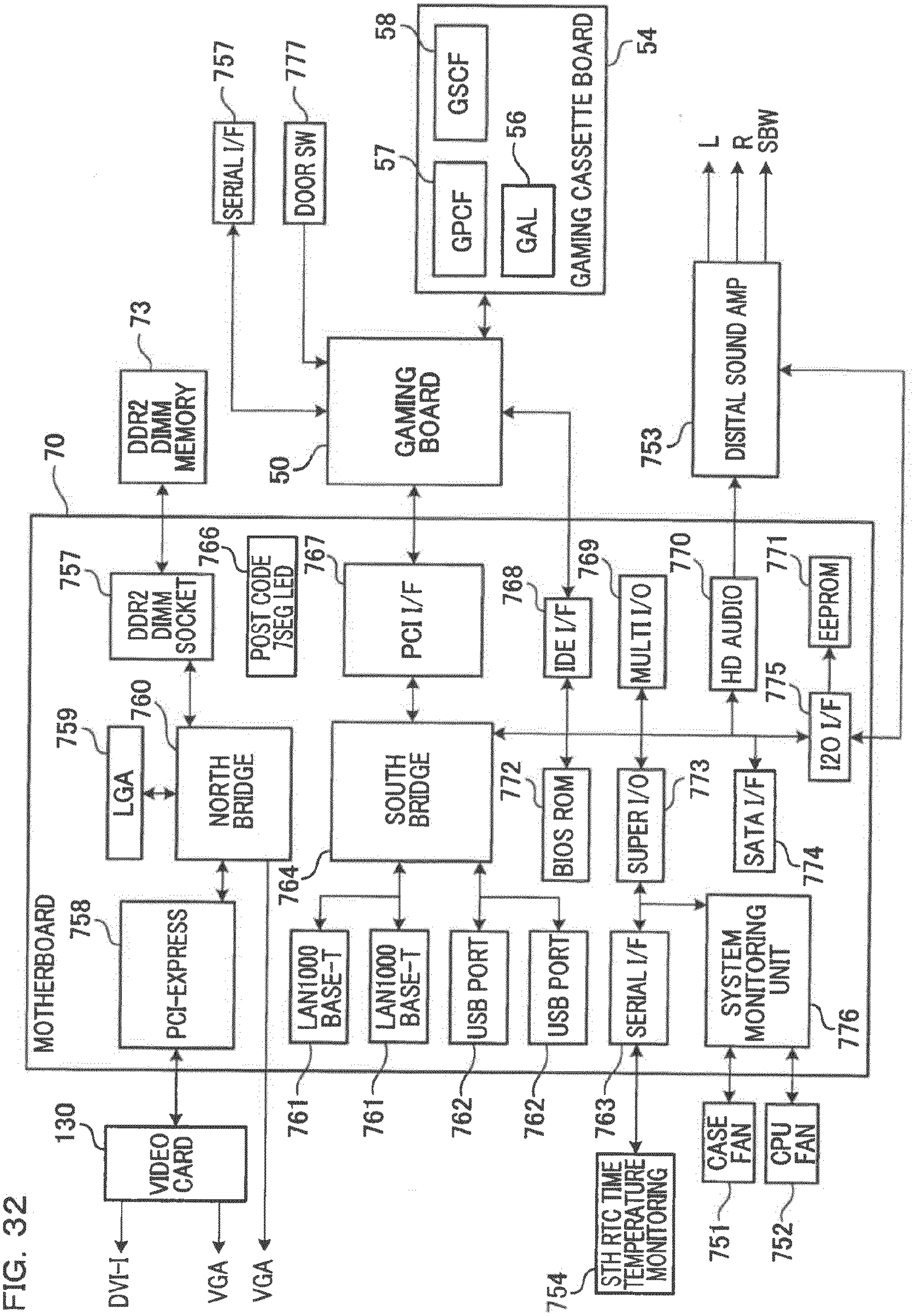
FIG. 32 is an explanatory diagram showing a structure around the motherboard of the slot machine in the example of the present invention.
Figure 33:
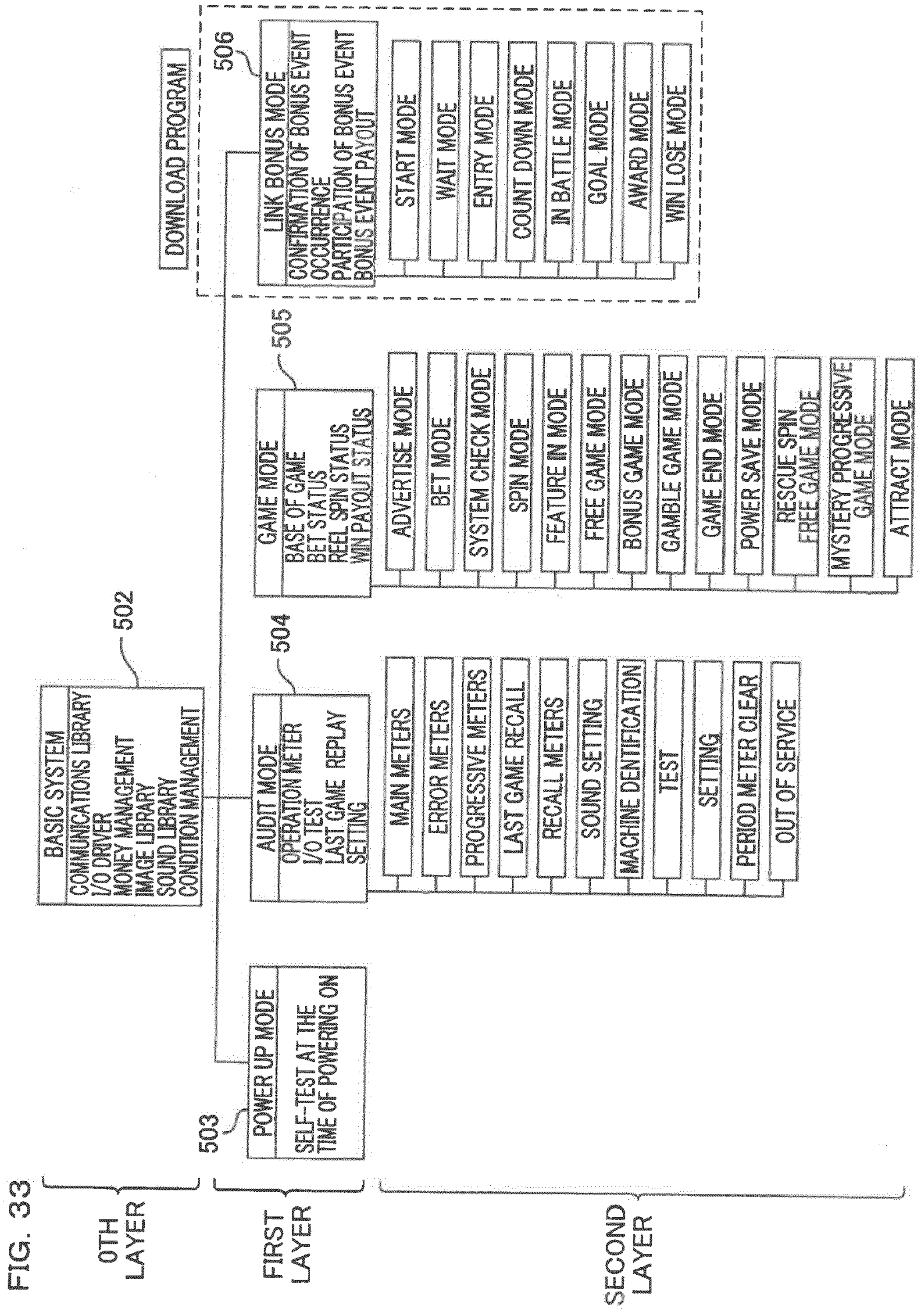
FIG. 33 is an explanatory diagram showing the structure of the game program of the gaming machine in the example of the present invention.

Next, the following describes an example of the present invention with reference to FIG. 32 to FIG. 33.

[Structure Around Motherboard]

FIG. 32 is an explanatory diagram showing the structure of and around the motherboard 70 of the slot machine 10, according to the present invention.

As shown in FIG. 32, the motherboard 70 is connected to and in communication with a gaming board 50, a graphic board 130, a CASE? FAN 751, a CPU? FAN 752, an amplifier 753, and a temperature sensor 754.

The gaming board 50 is connected to and in communication with: a gaming cassette board 54 having the GPCF 57 (GPCF), the GSCF 58 (GSCF), and the GAL 56; a DOOR? SW 777, and a serial I/F 757.

Further, as shown in FIG. 32, the motherboard 70 has: a PCI-Express 758, an LGA 759, a NORTHBRIDGE 760, a LAN port 761, a USB port 762, a serial I/F 763, a SOUTHBRIDGE 764, a DDR2 socket 757 to be connected to the RAM 73, a POST code display unit 766, a PCII/F767, an IDEI/F768, a MULTI I/O 769, an HD Audio 770, an EEPROM 771, a BIOS ROM 772, a SUPER I/O 773, a SATA I/O 774, and an 120 I/O 775.

[Structure of Game Program]

Next, the following describes the structure of the program of the gaming machine in the example of the present invention.

As shown in FIG. 33, the program of the example of the present invention has three layers. In a first layer is a basic system 502 having programs and library related to sounds and images.

In a second layer which is a subordinate layer of this basic system 502, there are POWERUP mode 503, an AUDIT mode 504, a GAME mode 505, and a LINK BONUS mode 506.

The POWERUP mode 503 has a program for performing a self-test at the time of powering on. The AUDIT mode 504 includes a program for performing input/output test or the like. The GAME mode 505 includes programs serving as the base, when running the game. Such a program includes a program for spinning the video reel 3. The POWERUP mode 503, the AUDIT mode 504, and the GAME mode 505 are stored in the GPCF 57 and the GSCF 58 inserted in the slot 55 of the slot machine 10.

The LINK BONUS mode 506 is the common game information received from the external controller 200, and is a program for use when running the common game. This LINK BONUS mode 506 is structured by a DLL (Dynamic Link Library).

Further, the POWERUP mode 503, the AUDIT mode 504, the GAME mode 505, and the LINK mode BONUS 506 each has a subordinate layer (third layer).

The detail description provided hereinabove mainly deals with the characteristics of the present invention for the sake of easier understanding of the present invention. The present invention however is not limited to the above embodiment, and may be applicable to other embodiments. The scope of application should be understood as to be as broad as possible. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The above described embodiment encompasses the processes performed in computers or on a computer network. The above descriptions and expressions are provided to allow the one skilled in the art to most efficiently understand the present invention. A process performed in or by respective steps yielding one result or blocks with a predetermined process function described in the present specification shall be understood as a process with no self-contradiction. Further, the electrical or magnetic and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially performed by various devices. Further, the other structures necessary for the steps or blocks are obvious from the above descriptions.

REFERENCE NUMERALS

10. Slot Machine (Gaming Terminal)
31. Spin Button
71. Main CPU
73. RAM
200. External Controller (Collective Control Device)
241. Main CPU
243 RAM
300. Gaming Machine

What is claimed is:

1. A gaming system comprising:

a plurality of gaming terminals each having a terminal-side game information storage device which stores common game information used in a common game commonly run in the plurality of gaming terminals and individual game information used in an individual game individually run in each gaming terminal, an input device which allows an input from the exterior, and a terminal controller;

a collective control device connected to and in communication with the gaming terminals, which has a game information management device for managing the common game information, and a center controller, wherein the terminal controller is programmed to execute the steps of:

(a1) transmitting a common game information requesting command to the collective control device, when booting a gaming terminal;

(a2) storing the common game information received from the collective control device in the terminal-side game information storage device;

(a3) running the individual game in response to an input of start operation through the input device, based on the individual game information stored in the terminal-side game information storage device;

(a4) running the common game in response to a common game starting command from the collective control device, based on the common game information stored in the terminal-side game information storage device; and wherein the center controller is programmed to execute the steps of:

(b1) transmitting, in response to the common game information requesting command from any of the gaming terminals, the common game information managed by the game information management device to that gaming terminal; and (b2) when a common game start condition is met, transmitting the common game starting command to the plurality of gaming terminals; and, wherein the collective control device determines the gaming terminal transmitting the common game information requesting command and sends the common game information to the determined gaming terminal.

2. The gaming system of claim 1, wherein the terminal controller is programmed to further execute the steps of:

(a5) awarding a payout of the common game, based on a game result of the common game from the collective control device, and wherein the center controller is programmed to further execute the steps of:

(b3) determining whether or not the common game starting condition is met, based on the status of the individual game running in the gaming terminal;

(b4) determining a game result of the common game in each gaming terminal, based on the status of the common game running; and (b5) transmitting the game result of the common game to the plurality of gaming terminals.

3. The gaming system of claim 2, wherein the collective control device connected to and in communication with the gaming terminals has a gaming terminal information storage device storing an accumulated value of trigger values for use in determining a starting condition of the common game in the form of total accumulated value common in the plurality of gaming terminals or in the form of individual accumulated value of each of the gaming terminals, and wherein the terminal controller is programmed to execute the steps of:

(a6) transmitting a trigger value to the collective control device, every time the individual game is run;

and wherein the center controller is programmed to execute the steps of:

(b6) when a trigger value is received from any of the gaming terminals, adding the trigger value to the total accumulated value or the individual accumulated value stored in the gaming terminal information storage device of the gaming terminal having transmitted the trigger value; and (b7) transmitting to the plurality of gaming terminals a common game starting command for starting the common game in each of the gaming terminals, when the total accumulated value or the individual accumulated value of any one of the gaming terminals stored in the gaming terminal information storage device reaches a predetermined threshold.

4. The gaming system of claim 1, wherein wherein the terminal controller is programmed to execute the steps of:

(e1) transmitting to the collective control device a common game information requesting command including the identification information stored in the terminal-side game information storage device, when booting the gaming terminal;

(e2) when the common game information and the identification information are received from the collective control device, storing the common game information and the identification information received in the terminal-side game information storage device;

(e3) running the individual game in response to an input of start operation through the input device, based on the individual game information stored in the terminal-side game information storage device;

(e4) running the common game in response to a common game starting command from the collective control device, based on the common game information stored in the terminal-side game information storage device; and (e5) awarding a payout of the common game, based on the game result of the common game from the collective control device, and wherein the center controller is programmed to execute the steps of:

(f1) receiving the common game information requesting command from the gaming terminal, and determining whether the identification information contained in the common game information requesting command and the identification information managed by the game information management device match with each other;

(f2) only when it is determined that the pieces of identification information do not match with each other in (f1), transmitting the common game information and the identification information corresponding to the common game information, the common game information and the identification information being managed by the game information management device, to the gaming terminal having transmitted the common game information requesting command;

(f3) determining whether or not a common game starting condition is met, based on the status of the individual game running in the gaming terminal;

(f4) when the common game starting condition is met, transmitting the common game starting command to the plurality of gaming terminals;

(f5) determining the game result of the common game based on the state of the common game running in the gaming terminal;

(f6) transmitting the game results of the common game to the plurality of gaming terminals.

5. A communication control method for use in a gaming system including:

a plurality of gaming terminals each having a terminal-side game information storage device which stores common game information used in a common game commonly run in the plurality of gaming terminals and individual game information used in an individual game individually run in each gaming terminal, and an input device which allows an input from the exterior; and a terminal controller;

a collective control device connected to and in communication with the gaming terminals, which has a game information management device for managing the common game information, and a central controller, wherein the terminal controller is programmed to perform the steps of:

transmitting a common game information requesting command to the collective control device, when booting the gaming terminal;

storing the common game information received from the collective control device in the terminal-side game information storage device;

running the individual game in response to an input of start operation through the input device, based on the individual game information stored in the terminal-side game information storage device;

running the common game in response to a common game starting command from the collective control device, based on the common game information stored in the terminal-side game information storage device; and wherein the collective control device is programmed to perform the steps of:

transmitting, in response to the common game information requesting command from any of the gaming terminals, the common game information managed by the game information management device to that gaming terminal;

when a common game starting condition is met, transmitting the common game starting command to the plurality of gaming terminals; and, wherein the collective control device determines the gaming terminal transmitting the common game information requesting command and sends the common game information to the determined gaming terminal.

6. The communication control method for use in the gaming system of claim 5, wherein the terminal controller is programmed to further execute the steps of:

awarding a payout of the common game, based on a game result of the common game from the collective control device, and wherein the center controller is programmed to further execute the steps of:

determining whether or not the common game starting condition is met, based on the status of the individual game running in the gaming terminal;

determining a game result of the common game in each gaming terminal, based on the status of the common game running; and transmitting the game result of the common game to the plurality of gaming terminals.

7. The communication control method for use in a gaming system according to claim 6, wherein:

the collective control device connected to and in communication with the gaming terminals has a gaming terminal information storage device storing an accumulated value of trigger values for use in determining a starting condition of the common game in the form of total accumulated value common in the plurality of gaming terminals or in the form of individual accumulated value of each of the gaming terminals, and wherein the terminal controller is programmed to perform the steps of:

transmitting a trigger value to the collective control device, every time the individual game is run;

and wherein the collective control device is programmed to perform the steps of:

when a trigger value is received from any of the gaming terminals, adding the trigger value to the total accumulated value or the individual accumulated value stored in the gaming terminal information storage device of the gaming terminal having transmitted the trigger value;

transmitting to the plurality of gaming terminals the common game starting command for starting the common game in each of the gaming terminals, when the total accumulated value or the individual accumulated value of any one of the gaming terminals stored in the gaming terminal information storage device reaches a predetermined threshold.

* * * * *